(12) United States Patent
Dinh et al.

(10) Patent No.: US 11,341,585 B2
(45) Date of Patent: May 24, 2022

(54) IMPORTANCE SKETCHING OF INFLUENCE DYNAMICS IN MASSIVE-SCALE NETWORKS

(71) Applicant: VIRGINIA COMMONWEALTH UNIVERSITY INTELLECTUAL PROPERTY FOUNDATION, Richmond, VA (US)

(72) Inventors: Thang N. Dinh, Richmond, VA (US); Hung T. Nguyen, Richmond, VA (US)

(73) Assignee: VIRGINIA COMMONWEALTH UNIVERSITY INTELLECTUAL PROPERTY FOUNDATION, Richmond, VA (US)

( * ) Notice: Subject to any disclaimer, the term of this patent is extended or adjusted under 35 U.S.C. 154(b) by 223 days.

(21) Appl. No.: 16/487,134

(22) PCT Filed: Feb. 21, 2018

(86) PCT No.: PCT/US2018/018941
§ 371 (c)(1),
(2) Date: Aug. 20, 2019

(87) PCT Pub. No.: WO2018/156572
PCT Pub. Date: Aug. 30, 2018

(65) Prior Publication Data
US 2021/0142424 A1    May 13, 2021

Related U.S. Application Data

(60) Provisional application No. 62/461,683, filed on Feb. 21, 2017.

(51) Int. Cl.
*G06Q 10/00* (2012.01)
*G06Q 50/00* (2012.01)
(Continued)

(52) U.S. Cl.
CPC .......... *G06Q 50/01* (2013.01); *G06F 16/9027* (2019.01); *G06Q 10/10* (2013.01); *G06Q 30/0201* (2013.01); *H04W 84/18* (2013.01)

(58) Field of Classification Search
CPC .... G06Q 50/01; G06Q 10/10; G06Q 30/0201; G06F 16/9027; G06F 16/9024; H04W 84/18
See application file for complete search history.

(56) References Cited

U.S. PATENT DOCUMENTS 9,436,760 B1    9/2016    Tacchi et al.
2011/0029571 A1    2/2011    Aggarwal et al.
(Continued)

OTHER PUBLICATIONS

An optimal $(\epsilon,\delta)$-approximation scheme for the mean of random variables with bounded relative variance Jun. 2017Random Structures and Algorithms 55(3) DOI:10.1002/rsa.20839 Published Jun. 29, 2017.*

(Continued)

*Primary Examiner* — Gabrielle A McCormick
(74) *Attorney, Agent, or Firm* — Meunier Carlin & Curfman LLC

(57) ABSTRACT

A hyper-graph sketching framework receives graph data set to generate non-singular reverse cascades in a network to assess influence dynamics therein. A high-quality influence oracle for seed sets uses the resulting sketch data set generated from the non-singular reverse cascades to output estimation of influence.

19 Claims, 18 Drawing Sheets

(51) Int. Cl.
    *G06F 16/901*     (2019.01)
    *G06Q 10/10*     (2012.01)
    *G06Q 30/02*     (2012.01)
    *H04W 84/18*     (2009.01)

(56) References Cited

U.S. PATENT DOCUMENTS

| | | | |
|---|---|---|---|
| 2012/0078927 | A1 | 3/2012 | Gollapudi |
| 2015/0347625 | A1* | 12/2015 | Werneck ........... G06F 16/24569 707/798 |
| 2016/0357720 | A1 | 12/2016 | Thimbleby |
| 2017/0011296 | A1* | 1/2017 | Ahmed ................ G06N 7/005 |
| 2018/0018709 | A1* | 1/2018 | Sela ................ G06Q 30/0271 |

OTHER PUBLICATIONS

Nguyen et al., "Cost-aware targeted viral marketing in billion-scale networks," in INFOCOM. IEEE, pp. 1-9 (2016).

Tang et al., "Influence maximization in near-linear time: A martingale approach," in SIGMOD, pp. 1539-1554 (2015).

Cohen et al., "Sketch-based influence maximization and computation: Scaling up with guarantees," CIKM. ACM, 629-638 (2014).

Borgs et al., "Maximizing Social Influence in Nearly Optimal Time." SODA. SIAM, 946-957 (2014).

Ohsaka et al., "Fast and accurate influence maximization on large networks with pruned monte-carlo simulations," in AAAI (2014).

Nguyen et al., "Stop-and-stare: Optimal sampling algorithms for viral marketing in billion-scale networks," in SIGMOD, ACM, pp. 695-710 (2016).

Nguyen et al., "Importance Sketching of Influence Dynamics in Billion-Scale Networks", Conference: 2017 IEEE International Conference on Data Mining (ICDM) (2017).

Tang et al., "Influence maximization: Near-optimal time complexity meets practical efficiency," in SIGMOD. ACM, pp. 75-86 (2014).

Ohsaka et al., "Dynamic influence analysis in evolving networks," VLDB, vol. 9, No. 12, pp. 1077-1088 (2016).

International Search Report and Written Opinion dated Jun. 19, 2018, from International Application No. PCT/US2018/018941, 9 pages.

* cited by examiner

200 ↴

202 — 1 Pick a node $v \in V$ as the source with probability in Eq. 1;
204 — 2 Select an in-neighbor $u_i$ of $v$, $u_i \in N^{in}(v)$, with probability of selecting $u_i$ given in Eq. 4;
206 — 3 Initialize a queue $Q = \{u_i\}$ and a node set $R_j = \{v, u_i\}$;
208 {
  4 foreach $u_t \in N^{in}(v), t \neq i$ do
  5     With probability $w(u_t, v)$:
  6         $Q.\text{push}(u_t); R_j \leftarrow R_j \cup \{u_t\}$;
}
210 {
  7 while $Q$ *is not empty* do
  8     $v = Q.\text{pop}();$ // get the longest inserted node
  9     foreach $u \in N^{in}(v) \setminus (R_j \cup Q)$ do
  10         With probability $w(u, v)$:
  11            $Q.\text{push}(u); R_j \leftarrow R_j \cup \{u\};$ // insert $u$
}
12 return $R_j$;

Algorithm 2: SKIS-based Influence Oracle

302 — Input: Graph $G = (V, E, w)$
304 — 1 Preprocessing: Generate a SKIS sketch $\mathcal{R} = \{R_1, \ldots, R_T\}$ of IIS samples using Alg. 1.
306 — 2 For any influence query for any set $S$: return $\hat{\mathbb{I}}_\mathcal{R}(S)$ (Eq. 11).

FIG. 3

|  |  | Average Relative Difference (%) | | | | |
| --- | --- | --- | --- | --- | --- | --- |
|  |  | SKIS | | SKRIS | | SKIM |
| \|S\| | Dataset | h(5) | h(10) | h(5) | h(10) | k(64) |
| 1 | NetPHY | 6.2 | 3.7 | 14.0 | 7.8 | 7.5 |
|  | Epinions | 4.7 | 3.0 | 15.7 | 11.8 | 19.6 |
|  | DBLP | 3.8 | 4.1 | 13.7 | 11.6 | 5.0 |
|  | Orkut | 10.3 | 9.2 | 13.5 | 8.8 |  |
|  | Twitter | 10.9 | 10.5 | 21.4 | 16.0 |  |
|  | Friendster | 15.9 | 10.2 | 22.2 | 13.3 | n/a |
| 100 | NetPHY | 0.9 | 0.6 | 1.0 | 0.7 | 2.1 |
|  | Epinions | 1.0 | 0.7 | 1.0 | 1.0 | 7.6 |
|  | DBLP | 0.9 | 0.6 | 1.9 | 1.4 | 5.0 |
|  | Orkut | 0.9 | 0.6 | 1.1 | 0.7 |  |
|  | Twitter | 1.1 | 1.2 | 1.3 | 1.1 |  |
|  | Friendster | 0.9 | 0.7 | 0.9 | 0.7 | n/a |
| 1000 | NetPHY | 0.6 | 0.8 | 0.9 | 1.0 | 0.6 |
|  | Epinions | 0.6 | 0.6 | 0.6 | 0.7 | 2.3 |
|  | DBLP | 0.2 | 0.3 | 0.2 | 0.2 | 1.7 |
|  | Orkut | 0.3 | 0.3 | 0.3 | 0.3 |  |
|  | Twitter | 0.9 | 0.9 | 1.0 | 0.9 |  |
|  | Friendster | 0.3 | 0.3 | 0.3 | 0.2 | n/a |

FIG. 4

| | | Index Time [second (or h for hour)] | | | Index Memory [MB (or G for GB)] | | | |
|---|---|---|---|---|---|---|---|---|
| M | Nets | SKIS $h(5)$ | RIS $h(10)$ | SKIM $h(10)$ $k(64)$ | SKIS $h(5)$ | RIS $h(10)$ | RIS $h(10)$ | SKIM $k(64)$ |
| WC | PHY | 0 | 1 | 2 | 41 | 83 | 52 | 105 |
| | Epin. | 1 | 1 | 10 | 63 | 126 | 81 | 220 |
| | DBLP | 10 | 18 | 7 | 14 | 37 | 702 | 1G | 848 | 2G | 2G |
| | Orkut | 92 | 157 | 69 | 148 | 0.6h | 2G | 5G | 3G | 5G | 9G |
| | Twit. | 0.6h | 0.9h | 0.4h | 1.0h | 5.2h | 38G | 76G | 42G | 84G | 44G |
| | Frien. | 0.8h | 1.8h | 0.8h | 1.9h | dnf | 59G | 117G | 61G | 117G | dnf |
| TRI | PHY | 0 | 1 | 1 | 2 | 1 | 46 | 90 | 97 | 194 | 99 |
| | Epin. | 1 | 1 | 1 | 1 | 29 | 41 | 82 | 41 | 84 | 230 |
| | DBLP | 11 | 34 | 18 | 36 | 22 | 1G | 2G | 2G | 5G | 2G |
| | Orkut | 88 | 206 | 89 | 197 | dnf | 2G | 4G | 2G | 4G | dnf |
| | Twit. | 0.6h | 1.2h | 0.5h | 1.3h | dnf | 36G | 69G | 36G | 69G | dnf |
| | Frien. | 0.9h | 2.3h | 1.0h | 2.4h | dnf | 54G | 108G | 54G | 108G | dnf |

FIG. 9

| | Nets | Running Time [s (or h)] | | | Total Memory [M (or G)] | | | Expected Influence (%) | | | #Samples [×10³] | | |
|---|---|---|---|---|---|---|---|---|---|---|---|---|---|
| | | IMM | PMC | DSSA | DSSA+SKIS | IMM | PMC | DSSA | DSSA+SKIS | IMM | PMC | DSSA | DSSA+SKIS | IMM | DSSA | DSSA+SKIS |
| WC | PHY | 0.1 | 3.1 | 0.0 | 0.0 | 31 | 86 | 26 | 9 | 6.64 | 6.7 | 5.33 | 5.34 | 103.3 | 8.9 | 3.8 |
| | Epin. | 0.2 | 10.5 | 0.0 | 0.0 | 39 | 130 | 34 | 17 | 19.4 | 19.8 | 17.9 | 16.6 | 39.8 | 4.48 | 0.9 |
| | DBLP | 1.1 | 137.4 | 0.1 | 0.1 | 162 | 60 | 136 | 113 | 10.8 | 11.2 | 9.3 | 8.5 | 93.0 | 5.4 | 2.6 |
| | Orkut | 24.1 | 1.4h | 2.6 | 0.9 | 4G | 6G | 2G | 2G | 6.7 | 8.7 | 5.7 | 5.1 | 174.4 | 11.52 | 2.6 |
| | Twit. | 67.3 | mem | 5.5 | 6.3 | 30G | mem | 17G | 16G | 25.80 | mem | 24.1 | 21.0 | 54.0 | 18.0 | 0.8 |
| | Frien. | dnf | mem | 78.3 | 43.6 | dnf | mem | 35G | 36G | dnf | mem | 0.38 | 0.38 | mem | 215.0 | 102.4 |
| TRI | PHY | 0.2 | 1.5 | 0.0 | 0.0 | 50 | 61 | 30 | 9 | 1.77 | 1.73 | 1.4 | 1.5 | 370.1 | 35.8 | 3.8 |
| | Epin. | 13.9 | 6.9 | 2.0 | 0.6 | 483 | 40 | 72 | 33 | 5.7 | 5.9 | 5.47 | 5.46 | 123.0 | 8.9 | 0.5 |
| | DBLP | 3.2 | 20.1 | 0.3 | 0.2 | 389 | 54 | 191 | 118 | 0.32 | 0.31 | 0.28 | 0.24 | 3171.0 | 348.2 | 20.5 |
| | Orkut | dnf | 0.3h | 1.3h | 0.2h | dnf | 16G | 28G | 11G | dnf | 67.3 | 67.9 | 67.8 | dnf | 1.4 | 0.3 |
| | Twit. | dnf | mem | 5.2h | 0.6h | dnf | mem | 100G | 28G | dnf | mem | 24.2 | 24.4 | dnf | 3.4 | 0.4 |
| | Frien. | dnf | mem | mem | 3.1h | dnf | mem | mem | 99G | dnf | mem | mem | 40.1 | mem | mem | 0.2 |

FIG. 18

Algorithm 3: Greedy Algorithm on SKIS sketch

Input: SKIS sketch $\mathcal{R}$ and $k$
Output: An $(1 - (1 - 1/k)^k)$-approximate seed set $\hat{S}_k$ 1   $\hat{S}_k = \emptyset$
2   for $i = 1 : k$ do
3      $\hat{v} \leftarrow \arg\max_{v \in V \setminus \hat{S}_k} \left( \frac{\Delta_\mathcal{R}(v, \hat{S}_k)}{|\mathcal{R}|} \Gamma + (1 - \gamma_v) \right)$
4      Add $\hat{v}$ to $\hat{S}_k$
5   return $\hat{S}_k$ (lines 2–4 labeled 1902)

FIG. 19

| |S| | Nets | c(5) | | | c(10) | | |
|---|---|---|---|---|---|---|---|
| | | 0-hop | 1-hop | 2-hop | RIS | 0-hop | 1-hop | 2-hop | RIS |
| 1 | PHY | 4.2 | 2.1 | 0.9 | 14.0 | 4.0 | 2.1 | 0.6 | 7.8 |
| | Epin. | 7.0 | 6.0 | 5.3 | 15.7 | 4.6 | 4.4 | 4.1 | 11.8 |
| | DBLP | 4.8 | 1.9 | 1.0 | 13.7 | 4.8 | 1.4 | 0.3 | 11.6 |
| | Orkut | 10.2 | 10.5 | 10.2 | 13.5 | 9.2 | 8.8 | 8.3 | 8.8 |
| | Twit. | 10.9 | 10.5 | 10.1 | 21.4 | 10.7 | 9.1 | 8.2 | 16.0 |
| $10^3$ | PHY | 0.9 | 0.5 | 0.3 | 1.0 | 0.6 | 0.4 | 0.3 | 0.7 |
| | Epin. | 1.1 | 1.0 | 0.9 | 1.0 | 1.0 | 0.9 | 0.7 | 1.0 |
| | DBLP | 1.6 | 1.2 | 1.3 | 1.9 | 1.5 | 1.3 | 1.3 | 1.4 |
| | Orkut | 0.9 | 0.9 | 0.9 | 1.1 | 0.7 | 0.7 | 0.7 | 0.7 |
| | Twit. | 1.3 | 1.4 | 1.3 | 1.3 | 1.0 | 1.1 | 1.0 | 1.1 |

FIG. 20

| Nets | c(5) | | | | c(10) | | | |
|---|---|---|---|---|---|---|---|---|
| | 0-hop | 1-hop | 2-hop | RIS | 0-hop | 1-hop | 2-hop | RIS |
| Phy | 0.38 | 0.50 | 0.81 | 0.42 | 0.74 | 0.66 | 1.12 | 0.86 |
| Epin | 0.47 | 0.76 | 1.97 | 0.50 | 0.96 | 1.26 | 2.09 | 1.02 |
| DBLP | 0.82 | 0.86 | 1.31 | 0.79 | 1.35 | 1.40 | 1.79 | 1.20 |
| Orkut | 1.44 | 2.60 | 12.42 | 1.32 | 1.59 | 3.44 | 13.5 | 1.7 |
| Twitter | 1.56 | 3.64 | 4.32 | 1.4 | 1.98 | 4.39 | 5.32 | 2.01 |

FIG. 21

IMPORTANCE SKETCHING OF INFLUENCE DYNAMICS IN MASSIVE-SCALE NETWORKS

RELATED APPLICATION

This is a 371 application of International PCT application no. PCT/US2018/018941, filed Feb. 21, 2018, entitled "Importance Sketching of Influence Dynamics in Massive-Scale Networks," which claims priority to, and the benefit of, U.S. Provisional Appl. No. 62/461,683, filed Feb. 21, 2017, entitled "Importance Sketching for Estimating Influence," each of which is incorporated by reference herein in its entirety.

FIELD OF THE INVENTION

The present disclosure generally relates to the analysis of diffusion processes in networks.

BACKGROUND

Online social networks (OSNs) such as Facebook and Twitter have connected billions of users, providing gigantic communication platforms for exchanging and disseminating information. Recent to this application, Facebook, for example, has nearly 2 billion monthly active users and more than 2.5 billion pieces of content exchanged daily, both of which continue to grow. Through online social networks, companies and participants have actively capitalized on the "word-of-mouth" effect to trigger viral spread of various kinds of information into the network with the goal of influencing people's action and perception including commercial/marketing messages, political information/propaganda, and even "fake" news. In the past decade, a great deal of research have been conducted with the focus on diffusion analysis to analyze propagation of information and users' influence within a network, for example, for the end purpose of evaluating influence of a group of individuals (also referred to as influence estimation), finding smaller groups of influential individuals, (also referred to as influence maximization), and controlling diffusion processes via structure manipulation.

Sketching techniques have been developed for the construction of sketches, which are a collection of random samples that can be used to provide a 'compact summary' of dynamics in a given network. Performing approximate queries or optimization tasks over sketches can vastly speed up computation, save memory space, generate stable fingerprints against changes in the network, while providing solutions with provable guarantees. Yet, diffusion analysis is still challenging due to the sheer size of the networks, in many or all instances, raising serious challenges in computational efficiency and scalability. Many algorithms used in the assessment of influence maximization cannot fully evaluate networks with few million edges.

Sketch techniques based on generating reverse cascades from random sources are known. Cohen et al., "Sketch-based influence maximization and computation: Scaling up with guarantees," CIKM. ACM, 629-638 (2014), describes the use of a bottom-k min-hash sketch of the set of reachable nodes, and Borgs et al., "Maximizing Social Influence in Nearly Optimal Time." SODA. SIAM, 946-957 (2014), describes a proposed reverse influence sketch (RIS) in which each sketch is a random set of nodes that can reach a random source node, each of these manuscripts is incorporated by reference herein in its entirety. Benchmarking results in estimating nodes' influence and influence maximization show deficiencies in accuracy and scalability of both the sketches.

Improved approaches for analyzing influence dynamics in large-scale networks is still desired. In particular, it is desired to have more memory efficient and more accurate sketch to capture influence dynamics that can analyze massively large networks (e.g., OSN-based networks).

SUMMARY

The exemplified systems and methods describe a sketching methodology or framework (referred to herein as "Importance Influence Sampling Sketch", or "SKIS") that employs a sampling scheme (referred to herein as "Importance Influence Sampling, or IIS) that randomly evaluate subsets of nodes in the input data set, in which the random sampling is based on the probabilities of the selection producing a non-trivial result. Notably, the IIS scheme beneficially generates a sketch (namely, an "importance sketch", or "SKIS sketch") that contain samples of small variation and that provide estimations of high concentration while doing so with a smaller memory footprint and lesser processing time (thereby improving estimation efficiency) to those in the art.

The exemplified systems and methods further facilitate determination of an estimated influence of nodes in the generated sketch in which the estimated influence is indirectly determined based an expected influence. This indirect measure of estimated influence can be performed with reduced processing time and computation as compared to direct measure of such quantity. Further, the determination of expected influence of a group of samples can achieve similar or better quality to direct estimation of influence while doing so with fewer samples.

In some embodiments, this estimated influence, and changes thereto over time, can be used to evaluate stimuli that are applied to, or changes made to, the network. The estimated influence can be evaluated among different groups of nodes to ascertain which of group has a greater influence in the network. These tools can be applied to cybersecurity applications, network optimization, platform evaluations, and campaign tracking, among others.

In another aspect, a hybrid sketching technique is described that estimates "local influence" to a given node, which is used in the inclusion of the node in a sketch sample. That is, only samples that can be reached to some node in more than h hops would be counted. This technique can be used, e.g., to further reduce variations in the output and increase estimation accuracy.

In an aspect, a method is disclosed for generating a sketch data set. The method includes receiving, by one or more processors, a graph data set comprising a plurality of nodes for a network; and generating, by the one or more processors, a sketch data set (e.g., $\mathcal{R}$ or $R_j$) (e.g., a sparse hypergraph representation of the network) by uniformly sampling at random (e.g., via an influence importance sampling scheme) a plurality of source nodes from the graph data set, wherein the uniform sampling at random is based on determined probabilities (e.g., $\Pr[\text{src}(R_j)=v]$ or $\gamma_v/\Gamma$) of each source node having a non-singular reverse cascade, wherein the non-singular reverse cascade comprises, at least, each source node and one or more neighbor nodes expected to have a quantifiable influence on the source node.

In some embodiments, the received graph data set comprises a plurality of weight values each associated with a given node, wherein each weight value corresponds to a probability value (e.g., w(u, v)) of the given node being an edge node.

In some embodiments, the step of generating the sketch data set further comprises randomly sampling (e.g., uniformly sampling), by the one or more processors, a first in-neighbor nodes to add to a queue associated with the randomly sampled source node, wherein the sampling is based on probabilities (e.g., Pr[select u] or $w(u, v)/\gamma_v$) associated with weight values of the nodes being an edge node.

In some embodiments, the step of generating the sketch data set further comprises: iteratively adding, for each newly added node including the first in-neighbor node, neighbors of the newly-added node, wherein the addition of the neighbors is based on a random sampling having probabilities equal to an edge weight value associated with the newly added nod $$\left(e.g., \frac{w(u, v)}{\gamma_v}\right).$$

In some embodiments, the method further includes determining, by the one or more processor, a number of the plurality of source nodes to randomly sample to include in the sketch data set to provide a $(\epsilon, \delta)$-estimation guarantee, wherein, at least, number of the plurality of source nodes are randomly sampled to generate the sketch data set.

In some embodiments, the method further includes determining, by the one or more processors, an optimal cover set (e.g., $\tilde{S}_k$) of a pre-determined size (e.g., k) based on the generated sketch data set, wherein the optimal cover set comprises nodes that, in their aggregate, provide a maximum estimate of expected influence within the graph data set.

In some embodiments, the step of generating the sketch data set is based on, or combined with, an algorithm selected from the group consisting of a RIS-based algorithm, a TIM-based algorithm, a TIM⁺-based algorithm, an IMM-based algorithm, a BCT-based algorithm, a SSA-based algorithm, a DSSA-based algorithm, and a combination of any of the above.

In some embodiments, the weight values of the edges in the graph data set is determined based on an existing weight assignment models (e.g. weight cascade model or a trivalency model) or based on learning from data traces (e.g. frequencies of interactions among users).

In some embodiments, the step of generating the sketch data set comprises uniformly sampling at random (e.g., via an influence importance sampling scheme) a plurality of source nodes from the graph data set, wherein the uniform sampling at random is based on determined probabilities (e.g., Pr[src($R_j$)=v] or $\gamma_v/\Gamma$) of each source node having a non-singular reverse cascade, wherein the non-singular reverse cascade comprises, at least, each source node and one or more neighbor nodes expected to have a quantifiable influence on the source node; for each randomly sampled source node, randomly sampling (e.g., uniformly sampling), by the one or more processors, a first in-neighbor nodes to add to a queue associated with the randomly sampled source node, wherein the sampling is based on probabilities (e.g., Pr[select u] or $w(u, v)/\gamma_v$) associated with weight values of the nodes being an edge node; and iteratively adding, for each newly added node including the first in-neighbor node, neighbors of the newly-added node, wherein the addition of the neighbors is based on a random sampling having probabilities equal to an edge weight value associated with the newly added node.

In some embodiments, influence is determined based on an independent cascade model.

In some embodiments, influence is determined based on a linear threshold model.

In some embodiments, influence is determined based on a continuous-time model.

In some embodiments, the method further includes, in response to receipt of an influence inquiry, wherein the influence inquiry comprises a list of one or more nodes in the network, determining, by the one or more processors, an estimated expected influence value of the one or more nodes.

In some embodiments, the method further includes generating a first sketch data set based on a first graph data set; generating a second sketch data set based on a second graph data set; and determining, by the one or more processors, changes between a first estimated expected influence value for a set of nodes determined from the first sketch data set and a second estimated expected influence value for the set of nodes determined from the second sketch data set.

In some embodiments, the method further includes generating the sketch data set based on the graph data set; determining, by the one or more processors, a first estimated expected influence value for a first set of nodes determined from the sketch data set; determining, by the one or more processors, a second estimated expected influence value for a second set of nodes determined from the sketch data set, wherein the first set of nodes is different from the second set of nodes; and generating, by the one or more processors, a report of the first estimated expected influence value and the second estimated expected influence value.

In some embodiments, the sketch data set is used to detect, or evaluate impact of, stealthy cyber-attacks, adversarial social campaigns, and coordinated market manipulation.

In some embodiments, the network comprises a social network platform (e.g., Facebook, Twitter, etc.).

In some embodiments, the steps are performed on a cloud service platform.

In another aspect, a system is disclosed. The system includes a processor; and a memory having instructions stored thereon, wherein execution of the instructions by the processor, cause the processor to perform any of the above method.

In another aspect, a non-transitory computer readable medium is disclosed. The non-transitory computer readable medium has instructions stored thereon, wherein execution of the instructions by a computing device causes the computing device to perform the any of the above method.

BRIEF DESCRIPTION OF THE DRAWINGS

The accompanying drawings, which are incorporated in and constitute a part of this specification, illustrate embodiments and together with the description, serve to explain the principles of the methods and systems. The patent or application file contains at least one drawing executed in color. Copies of this patent or patent application publication with color drawing(s) will be provided by the Office upon request and payment of the necessary fee.

Embodiments of the present invention may be better understood from the following detailed description when read in conjunction with the accompanying drawings. Such embodiments, which are for illustrative purposes only, depict novel and non-obvious aspects of the invention. The drawings include the following figures:

FIG. 2 is a diagram of an example method to generate a single sampling for a sketch data set, in accordance with the illustrative embodiment.

FIG. 3 is a diagram of an example method to operate an IIS-based influence oracle (also referred to as a SKIS-based oracle), in accordance with an illustrative embodiment.

FIG. 4 shows a table of average relative differences among the different algorithms evaluated for solution quality, running time and memory usage.

FIG. 9 present the computing time and memory use comparisons among the SKIS algorithm and other algorithms.

FIGS. 10, 11, 12, 13, 14, 15, 16, 17, and 18 are comparison results of a produced IIS sketch with respect to sketches produced from other algorithms from which the seed set with maximum influence in networks are evaluated.

FIG. 19 is a diagram of an example method to perform a greedy algorithm on SKIS sketches, in accordance with the illustrative embodiment.

FIG. 20 shows a table of estimation errors measured in relative difference among HIS, SKIS, and RIS, in accordance with an illustrative embodiment.

FIG. 21 is a table of average query time among HIS, SKIS, and RIS, in accordance with an illustrative embodiment.

DETAILED SPECIFICATION

Each and every feature described herein, and each and every combination of two or more of such features, is included within the scope of the present invention provided that the features included in such a combination are not mutually inconsistent.

Importance Sketching Sampling Algorithm

Figure 1:
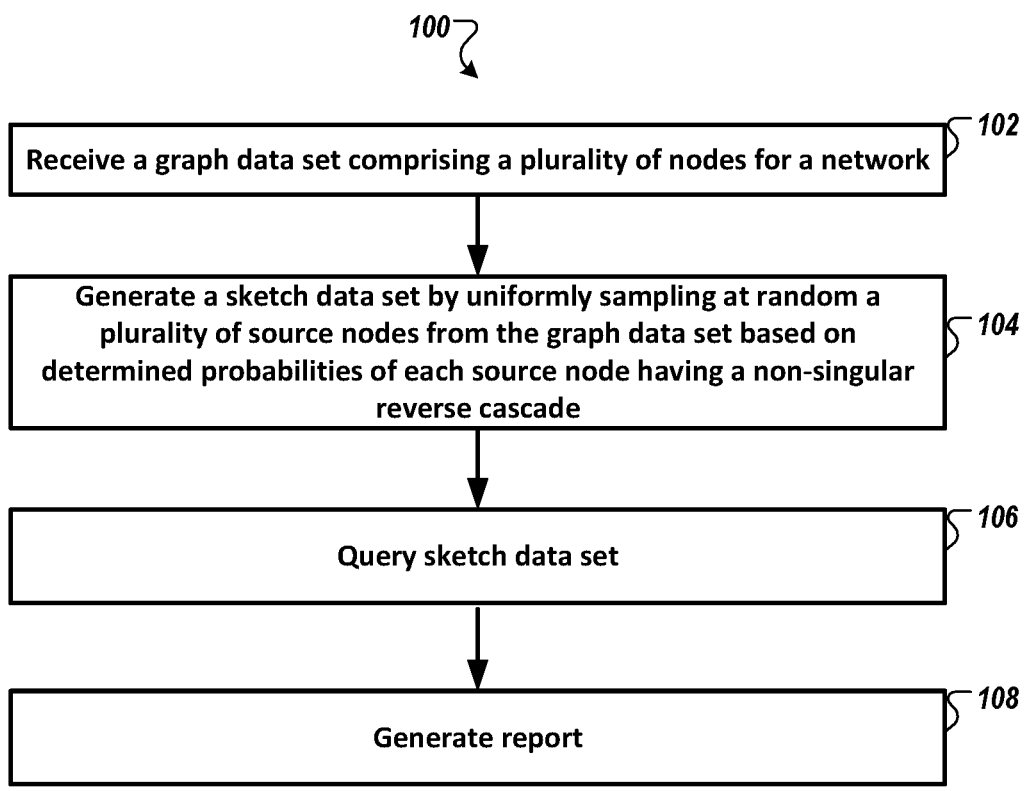
FIG. 1 is a flow diagram of a method to generate an importance influence sketch, in accordance with an illustrative embodiment.

FIG. 1 is a flow diagram of a method 100 to generate an importance influence sketch, in accordance with an illustrative embodiment.

In FIG. 1, the method 100 includes receiving (step 102), by one or more processors, a graph data set comprising a plurality of nodes for a network. The graph data set, in some embodiments, comprises a plurality of weight values each associated with a given node, wherein each weight value corresponds to a probability value (e.g., w(u, v)) of the given node being an edge node. A cascade can be considered as a set of nodes in which a preceding node is expected, or have been shown, to influence another node in the network once, once that preceding has been influenced. The weight of an edge (e.g., w(u, v)) represents the probability that the process spreads along edge from node v to node u. In some embodiments, the weight values of the edges in the graph data set are determined based on an existing weight assignment models (e.g. weight cascade model or a trivalency model) or based on learning from data traces (e.g. frequencies of interactions among users).

The method includes generating (step 104), by the one or more processors, a sketch data set (e.g., $\mathcal{R}$ or $R_j$) (e.g., a sparse hypergraph representation of the network) by uniformly sampling at random (e.g., via an influence importance sampling scheme) a plurality of source nodes from the graph data set. The uniform sampling at random is performed based on determined probabilities (e.g., $\Pr[src(R_j)=v]$ or $\gamma_v/\Gamma$) of each source node having a non-singular reverse cascade, wherein the non-singular reverse cascade comprises, at least, each source node and one or more neighbor nodes expected to have a quantifiable influence on the source node.

The generated sketch data set can be queried (step 106) to generate reports. In some embodiments, a query can be made to determine a subset of nodes (i.e., corresponding to people or accounts of people in the network) that have an estimated highest degree of influence to the network. In other embodiments, a query can be made to determine estimated influence, and changes thereof, of a set of one or more nodes in the network. In other embodiments, a query can be made to determine changes of estimated influence of a set of one or more nodes in relation to a stimuli being applied to the network. Further examples are discussed below.

FIG. 2 is a diagram of an example method 200 to generate a single sampling (also referred to as $R_j$) for a sketch data set, in accordance with the illustrative embodiment. The sampling is one among a number of samplings (e.g., $R_1 \ldots R_n$) that collectively forms the sketch data set. The sampling in essence produces a random non-singular samples with probabilities proportional to those in the original sample space of reverse influence samples and normalized by the probability of generating a non-singular ones.

The multiple iterations of steps 200 are performed in which each step involves the random sampling of a received graph data set to select a node for subsequent analysis in which the sampling is performed based on the probabilities that a node selection will generate a non-singular reverse cascade. Following a node selection, another random sampling is then performed to select, at least, one in-neighbor node to evaluate the extent of the non-singular cascade or a group of nodes having an expectancy of being associated to this in-neighbor node. Indeed, exemplified sampling methodology can generate a sketch as a collection of these non-singular reverse cascades that can have a quantifiable error rate and guarantee to which subsequent analysis of the network can be performed. Beneficially, the exemplified method can substantially improve the speed of generating a sketch as compared to other state of the art algorithms (in some instances, up to 10× faster) while also substantially using less memory (in some instances, 4× reduction in memory use).

Referring still to FIG. 2, in line "1" 202, the method 200 includes first picking a node v∈V (i.e., a node v within the set V of nodes in the network) as a source node with the probability defined in Equation 1. That is, a selection of a candidate source node (i.e., $src(R_j)$) as a node v for this sampling $R_j$ is made by randomly selecting (e.g., randomly selecting in uniform) a node v based on the probability of having the selection (i.e., $\Pr[src(R_j)=v]$) yield a non-singular sample. Indeed, the set of non-singular samples is a subset of all possible samples. The method 200 seeks to generate uniformly random samples from that subset. As shown in Equation 1, the probability Pr[src($R_j$)=v] can be determined based on a probability $\gamma_v$ of generating a non-singular sample and normalizing that probability by $\Gamma$ in which $\Gamma = \Sigma_{u \in V} \gamma_u$.

$$Pr[src(R_j) = v] = \frac{\gamma_v}{\Sigma_{u \in V} \gamma_u} = \frac{\gamma_v}{\Gamma} \quad \text{(Equation 1)}$$

To determine the probability $\gamma_v$ of generating a non-singular sample, $\gamma_v$ can be determined for each node in the network as, for example, provided in Equation 2.

$$\gamma_v = 1 - \Pi_{u \in N^{in}(v)}(1 - w(u,v)) \quad \text{(Equation 2)}$$

It can be shown that the probability of having a singular sample can be determined as Equation 3 in which w(u, v) is a weighted value (e.g., having a value between 0 and 1) associated with the probability that node u will influence node v once node u is influenced.

$$\Pi_{u \in N^{in}(v)}(1 - w(u,v)) \quad \text{(Equation 3)}$$

To this end, the probability of having a non-singular sample can be determined as a complement of that probability (i.e., as 1 minus the probability of having a singular sample, as provided in Equation 2). Equation 3 shows a determination for $\gamma_u$.

In some embodiments, w(u, v) is a weight value for a given node determined from a weight assignment models such as the weight cascade model or the trivalency model. In other embodiments, w(u, v) is derived from learning of data traces, e.g., based on frequencies of interactions among users. Other methods of determining probability of influence of edge nodes, for example, to determine w(u, v), can be used.

Referring back to FIG. 2, in line "2" 204, the method 200 further includes selecting an in-neighbor $u_i$ of v (in which $u_i \in N^{in}(v)$) associated with a bucket $B_i$ to which the node $u_i$ is placed in which the selection is by random sampling based on the probability of selecting $B_i$ as provided in Equation 4.

$$Pr[select\ B_i] = \frac{\prod_{t=1}^{i-1}(1 - w(u_t, v))w(u_i, v)}{\gamma_v} \quad \text{(Equation 4)}$$

A set of buckets $B_i$ associated with each in-neighbor nodes $u_i$ for a given source node is first established for a set of nodes $u_1, u_2$, to $u_l$. That is, $N^{in}(v) = \{u_1; u_2; \ldots ; u_l\}$ is a fixed-order set of in-neighbors of v. To this end, l number of buckets $B_i$ can be setup to which bucket $B_i$ having values $1 \leq i \leq l$ would initially contain only samples that: (1) source is v and (2) do not contains nodes $\{u_1, u_2, \ldots, u_{i-1}\}$ and (3) contains $u_i$.

As shown, Equation 4 involves performing repeated multiplications operations (i.e., via the Pi notation) of the weights that in-neighbor nodes $u_t \in \{u_1, u_2, \ldots, u_{i-1}\}$ will not influence the source node, "1−w($u_t$, v)", and the weight at the given in-neighbor node "w($u_i$,v)" would. The repeated multiplications operations is performed for t=1 to t=i−1, and the resulting is normalized by the probability $\gamma_v$ of generating a non-singular sample. It is noted that $\Sigma_{i=1}^{l}$ Pr[select $B_i$]=1.

It is noted that for i=1, Equation 4 can be expressed as the probability Pr[select $B_1$]=w($u_1$, v). Indeed, if bucket $B_i$ is assume to be selected, node $u_t$ can be added as a second node in the sample (in additional source v) to this sample $R_j$. For each other node $u_t$ in which t≠i, $u_t$ is selected into the sample $R_j$ with probability w($u_t$, v) following the reverse influence sketch (RIS) algorithm for an independent cascade (IC) model.

In some embodiments, the bucket $B_i$ is determined by dividing all the possible non-singular samples from a given selected source v into l buckets to which each bucket is determined, for example, and as noted above, according to reverse independent cascade. The bucket $B_i$ having values $1 \leq i \leq l$ is set to include all samples with the first node from $N^{in}(v)$ being $u_i$. That means, all the in-neighbor nodes $u_1; \ldots ; u_{i-1}$ may not be included in the sample, but $u_i$ is at least included in the sample for certain. Further, the other nodes from $u_{i+1}$ to $u_l$ may appear and can be sampled following a conventional or normal RIS sampling. To this end, for a given selection, say, bucket $B_i$ being selected, node $u_i$ is added as the second node in the bucket in addition to the source v into the bucket associated with $R_j$. As shown in Line 3 (206) of FIG. 2, the method 200 adds selected neighbors $u_i$ of a given source node v into a queue Q for evaluation and also adds both the given source node v and the selected neighbors $u_i$ to an IIS sample $R_j$.

Referring still to FIG. 2, lines "4-6" 208, each of the other incoming neighbor is evaluated to assess whether they influence the source. That is, for each other node $u_t$ in which t≠i, $u_t$ is selected into $R_j$ with probability that a selection equal to their edge weights w($u_t$; v) following, or in accordance with, the conventional or ordinary RIS algorithm for the independent cascade (IC) model.

The method 200 continues in this manner until no newly selected node is observed. Indeed, each of the other incoming neighbors also tries to influence the source. That is, for each newly selected node, its incoming neighbors are randomly added into the sample with the probabilities equal to their edge weight. This continues until no new selected node is observed. It is noted that line 3 not only adds the selected neighbors $u_i$ of v into Q, but also adds both v and the $u_i$ to $R_j$. As shown, the loop from Lines 7-11 (210) mimics the BFS-like sampling of RIS.

Further description of reverse independent sampling is provided in Borgs, "Maximizing Social Influence in Nearly Optimal Time", which has been incorporated by reference herein its entirety.

The exemplified methods and systems reduce the complexity in analyzing massive graph data sets (which may include hundreds of millions to billions of node) and the subsequent generation of a sketch therefrom, thereby reducing overall requirements for resource and time, while also producing results having a quantified guarantees for accuracy and/or error on the estimation of influence. Further, the exemplified methods and systems improve the quality of the result in generating large, and/or larger, reverse influence samples with smaller variances. It is observed that this quality improvement in the results can be further leverage in the estimation of influences of multiple seed sets as next discussed below.

Importance-Influence-Sampling (IIS)-Based Influence Oracle

Referring back to FIG. 1, as noted above, the generated sketch data set can be queried (step 106) to generate reports that has estimation of influence. Further, as described above, the exemplified methods and systems can improve the quality of the result in generating a smaller number of samples though the samples having large, and/or larger, reverse influence samples to which estimation of influences of multiple seed sets can be determined from this reduced set.

FIG. 3 is a diagram of an example method 300 to operate an IIS-based influence oracle (also referred to as a SKIS-based oracle), in accordance with an illustrative embodiment. The IIS-based influence oracle can produced expected influence using the IIS samples as an indirect measure of estimation of influence, which is substantially quicker and less resource-intensive to perform than a direct measure.

Notably, for a given a random IIS sample $R_j$ generated by Algorithm 1 (FIG. 2) from a graph input $\mathcal{G} =(V, E, w)$ for any set $S \subseteq V$, the expected influence $\mathbb{I}(S)$ of $S \subseteq V$ can be determined according to Equation 5.

$$\mathbb{I}(S) = Pr[R_j \cap S \neq \phi] \cdot \Gamma + \sum_{v \in S}(1 - \gamma_v) \qquad \text{(Equation 5)}$$

where $\gamma_v$ and $\Gamma$ are defined in Equations 1 and 2 and used in the generation of the IIS sampling from which they can now be reused in the determination of Equation 5.

As shown, the expected influence $\mathbb{I}(S)$ of any set S can be computed by two parts: comprises of two parts:

$$Pr[R_j \cap S \neq \phi] \cdot \Gamma \text{ and } \sum_{v \in S}(1 - \gamma_v).$$

Notably, the probability $Pr[R_j \cap S \neq \emptyset] \cdot \Gamma$ depends on the randomness of $R_j$. The second portion $$\sum_{v \in S}(1 - \gamma_v)$$

is a fixed quantity that is inherent to the set S and accounts for the contribution of singular samples in a sampling space $\Omega_{RIS}$ to the influence $\mathbb{I}(S)$, which $\Omega_{RIS}$ is the sample space of reverse influence samples (RIS) with probability $Pr[R_j \in \Omega_{RIS}]$ of generating sample $R_j$. Indeed, instead of computing or estimating the influence $\mathbb{I}(S)$ directly, the exemplified methods and systems can equivalently compute or estimate $$Pr[R_j \cap S \neq \phi] \cdot \Gamma + \sum_{v \in S}(1 - \gamma_v)$$

using IIS samples.

Notably, the exemplified methods and systems can produce random samples (in a sketch data set) having small variances that can be used to better concentrate or more quickly estimate expected influence (e.g., II(S)). To this end, the IIS-based influence oracle can produce estimation of influence (e.g., $\hat{\mathbb{I}}_\mathcal{R}(S)$) based on expected influence (e.g., II(S)) that can achieve similar or better quality of estimation while doing so with fewer samples.

In some embodiments, a query can be made to determine a subset of nodes (i.e., corresponding to people or accounts of people in the network) that have a highest degree of influence to the network. In other embodiments, a query can be made to determine estimated influence, and changes thereof, of a set of one or more nodes in the network. In other embodiments, a query can be made to determine changes of estimated influence of a set of one or more nodes in relation to a stimuli being applied to the network. Further examples are discussed herein.

Referring still to FIG. 3, an algorithm for a SKIS-based influence oracle is presented. The SKIS-based oracle is configured to make queries of estimated influence for a subset of nodes in a given network (e.g., OSN network).

As shown in FIG. 3, upon receipt (step 302) of a graph data set $\mathcal{G} =(V, E, w)$ a SKIS-based sketch $\mathcal{R}$ is generated (step 304), e.g., according to the description herein. The graph $\mathcal{G} =(V, E, w)$ is an abstraction of a network (e.g., social network) in which each edge $(u, v) \in E$ specifies a probability that node u will influence node v once node u has been influenced. In some embodiments, and as shown in FIG. 3, the SKIS-based sketch is generated, as a pre-processing step, based on an inquiry being submitted to the oracle. In other embodiments, the SKIS-based sketch is generated and stored to which a subsequent query can be applied.

Referring still to FIG. 3, upon receipt of an influence inquiry (e.g., for any set S), an estimation of influence $\hat{\mathbb{I}}_\mathcal{R}(S)$ can be calculated per Equation 6 based on the determined expected influence (e.g., II(S)) for that set S and returned as a result to the inquiry.

$$\hat{\mathbb{I}}_\mathcal{R}(S) = \frac{C_\mathcal{R}(S)}{|\mathcal{R}|} \cdot \Gamma + \sum_{v \in S}(1 - \gamma_v) \qquad \text{(Equation 6)}$$

As shown in Equation 6, the estimation of influence $\hat{\mathbb{I}}_\mathcal{R}(S)$ can be determined based on a determined coverage $C_\mathcal{R}(S)$ of the set S on the generated sketch $\mathcal{R}$ in which $C_\mathcal{R}(S)$ is determined per Equation 7. It is shown that the second part of $\hat{\mathbb{I}}_\mathcal{R}(S)$ is same fixed quantity that is inherent to the set S associated with the contribution of singular samples in a sampling space $\Omega_{RIS}$ to the influence II(S).

$$C_\mathcal{R}(S) = |\{R_j \in \mathcal{R} \; R_j \cap S \neq \emptyset\}| \qquad \text{(Equation 7)}$$

It can be shown that the results produced from the SKIS-based influence oracle provides a better estimation quality via analysis of the variance and the estimation of concentration properties.

In some embodiments, the estimation query is made to identify groups of individuals or organizations in a social network that contribute most to the diffusion of information, ideas, and/or acceptance or rejection thereof, in a network.

In some embodiments, the estimation query is used to determine extent of influence of individuals or organization, which can be used as a metric to evaluate effectiveness of a commercial campaign or political campaign, and such.

To achieve a high quality estimation of influence, the SKIS sketch should include a sufficient size of IIS samples. It is noted that there are multiple strategies to determine a number of IIS samples to include in a SKIS sketch to be queried.

In some embodiments, IIS samplings are added to the SKIS sketch until the total size of all samples reaches $$O\left(\frac{1}{\epsilon^3}(n + m)\log(n)\right).$$

This approach is further described in Ohsaka et al., "Dynamic influence analysis in evolving networks," VLDB, vol. 9, no. 12, pp. 1077-1088 (2016), which is incorporated by reference herein in its entirety. It is noted that this method provides an additive estimation error guarantee within $\epsilon$. Further, it is observed that generating IIS samples to reach a specified threshold is vastly faster than using RIS because of the size of bigger size of the IIS samples, thereby less samplings are performed.

In other embodiments, the IIS samplings is added until, at least, a sufficient number of samples is reached to provide a $(\epsilon,\delta)$-estimation of $\mathbb{I}(S)$. Indeed, for a set of S in which $\epsilon,\delta \geq 0$, the number of IIS samples would include at least $$\left(2\frac{\Gamma}{n} + \frac{2}{3}\epsilon\right)\ln\left(\frac{2}{\delta}\right)\ln\frac{n}{\mathbb{I}(S)}\epsilon^{-2}$$

so that the estimate of influence $\hat{\mathbb{I}}_{\mathcal{R}}(S)$ is an $(\epsilon,\delta)$-estimate of the expected influence $\mathbb{I}(S)$, namely, $\Pr[(1-\epsilon)\mathbb{I}(S) \leq \hat{\mathbb{I}}_{\mathcal{R}}(S) \leq (1+\epsilon)\mathbb{I}(S)] \geq 1-\delta$. This quantity of number of IIS samples can be computed based in part on Equations 16 and 17, below.

Even though $\mathbb{I}(S)$ is unknown in advance, a lower-bound of $\mathbb{I}(S)$, e.g., $|S|$ can be used to compute the necessary number of samples to provide the same guarantee. When compared to RIS which has weaker concentration bounds, it is observed that a factor of "$O(\Gamma/n)$" can be achieved.

Figure 5:
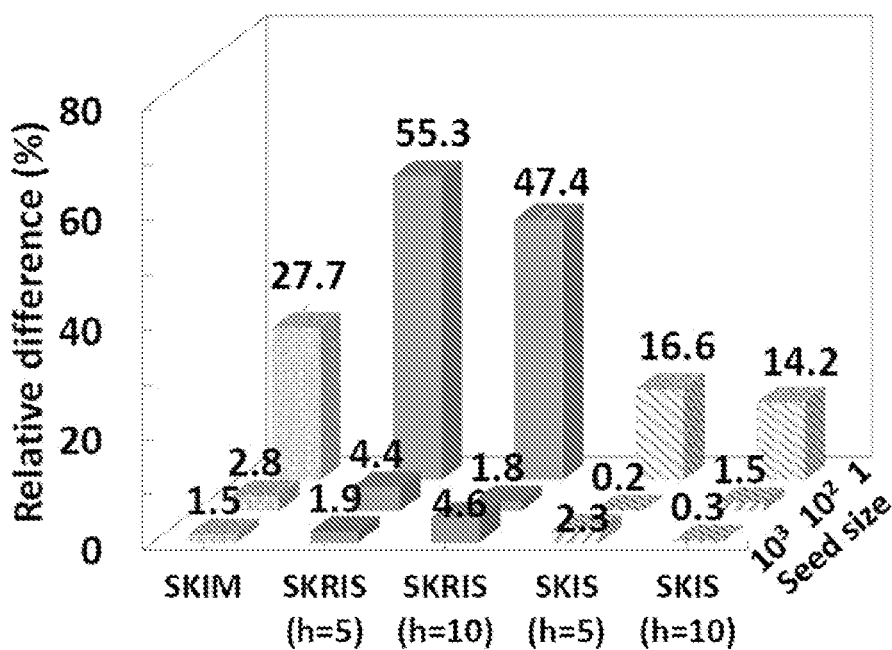
FIG. 5 shows relative difference of performance on the Epinion data set under the trivalency model.
Figure 6:
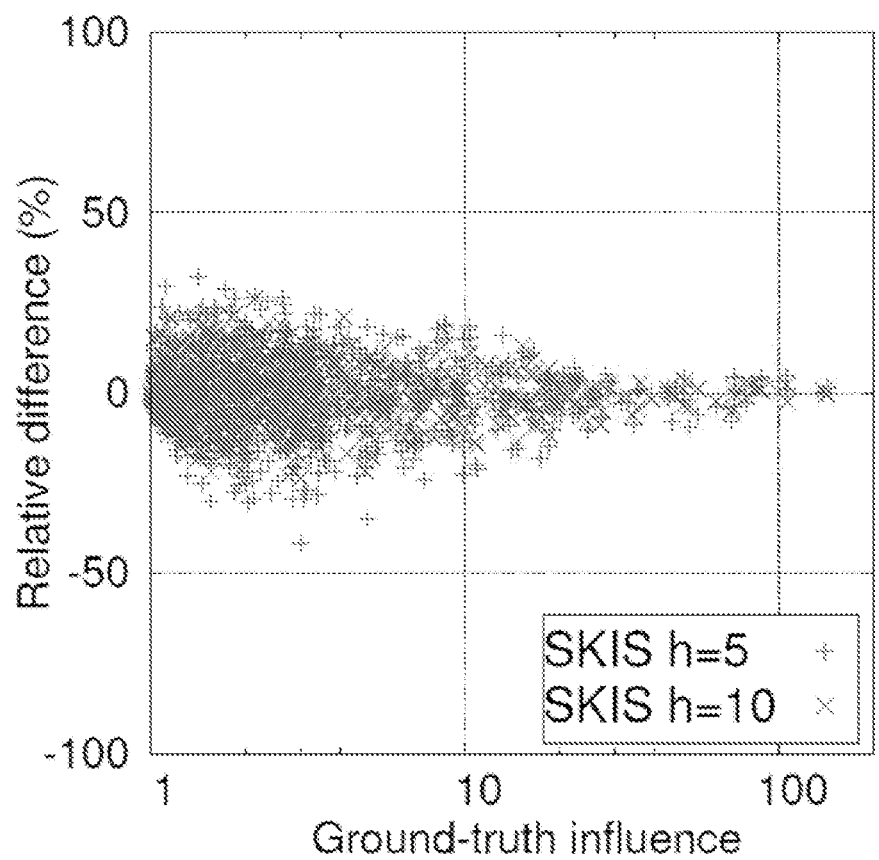
FIGS. 6-8 each shows error distributions for estimating influences of random seeds under the weighted cascade model for SKIS, RIS, and SKIM.

FIGS. 4-6 are diagrams showing example queries that can be submitted to the IIS-based influence oracle of FIG. 3, in accordance with various embodiments.

Improved Estimation of Influence Using SKIS Random Variables

As stated above, it can be shown that the results produced from the SKIS-based influence oracle provides a better estimation quality via analysis of the variance and the estimation of concentration properties.

For a random IIS sample $R_j$ and a set S, random variables can be defined per Equation 8 and 9.

$$X_j(S) = \begin{cases} 1 & \text{if } R_j \cap S \neq \phi \\ 0 & \text{otherwise.} \end{cases} \quad \text{(Equation 8)}$$

$$Z_j(S) = \frac{X_j(S) \cdot \Gamma + \sum_{v \in S}(1 - \gamma_v)}{n} \quad \text{(Equation 9)}$$

The mean of Equations 8 and 9 can then be determined per Equations 10 and 11.

$$\mathbb{E}[X_j(S)] = \Pr[R_j \cap S \neq \phi] = \frac{\mathbb{I}(S)\sum_{v \in S}(1 - \gamma_v)}{\Gamma} \quad \text{(Equation 10)}$$

$$\mathbb{E}[Z_j(S)] = \mathbb{E}[X_j(S)] \cdot \frac{\Gamma}{n} + \frac{\sum_{v \in S}(1 - \gamma_v)}{n} = \frac{\mathbb{I}(S)}{n} \quad \text{(Equation 11)}$$

From Equations 6 and 7, a corresponding set of random variables $Z_1(S), Z_2(S), \ldots, Z_T(S)$ can be constructed. Then, an empirical estimate $\hat{\mathbb{I}}_{\mathcal{R}}(S)$ of $\mathbb{I}(S)$ can be constructed in which $$\hat{\mathbb{I}}_{\mathcal{R}}(S) = \frac{n}{T}\sum_{j=1}^{T} Z_j(S).$$

For comparison purposes, let $Y_j(S)$ be a random variable associated with a RIS sample $Q_j$ in a RIS sketch $\mathcal{Q}$ per Equation 12.

$$Y_j(S) = \begin{cases} 1 & \text{if } Q_j \cap S \neq \phi \\ 0 & \text{otherwise.} \end{cases} \quad \text{(Equation 12)}$$

The mean of $Y_j(S)$ can be expressed as Equation 13 based on the proposition that estimating and/or maximizing $\mathbb{I}(S)$ is equivalent to estimating and/or maximizing the probability of $\Pr[R_j \cap S \neq \emptyset]$.

$$\mathbb{E}[Y_j(S)] = \frac{\mathbb{I}(S)}{n} \quad \text{(Equation 13)}$$

As shown, the mean $\mathbb{E}[Z_j(S)]$ of a random IIS sample $R_j$ and a set S per Equation 9 is the same as the mean $\mathbb{E}[Y_j(S)]$ per Equation 13.

Variance Reduction Analysis. Further, it can be shown that the variance of $Z_j(S)$ for a SKIS sketch is much smaller than that of $Y_j(S)$ for a RIS sketch. The variance of $Z_j(S)$ can be stated per Equation 14.

$$Var[Z_j(S)] = \frac{\mathbb{I}(S)}{n}\frac{\Gamma}{n} - \frac{\mathbb{I}^2(S)}{n^2} - \frac{\sum_{v \in S}(1-\gamma_v)}{n^2}\left(\Gamma + \sum_{v \in S}(1-\gamma_v) - 2\mathbb{I}(S)\right) \quad \text{(Equation 14)}$$

Since the random variables $Y_j(S)$ for RIS samples are Bernoulli and $$\mathbb{E}[Y_j(S)] = \frac{\mathbb{I}(S)}{n},$$

the variance of $Y_j(s)$ can be determined in which $$Var[Z_j(S)] = \frac{\mathbb{I}(S)}{n}\left(1 - \frac{\mathbb{I}(S)}{n}\right).$$

When compared with the variance of $Z_j(S)$, it can be observed that since $$\frac{\Gamma}{n} \leq 1, \frac{\mathbb{I}(S)}{n}\frac{\Gamma}{n} - \frac{\mathbb{I}^2(S)}{n^2} \leq \frac{\mathbb{I}(S)}{n} - \frac{\mathbb{I}^2(S)}{n^2} = Var[Y_j(S)].$$

Further, it could be observed that $$Var[Z_j(S)] \leq Var[Y_j(S)] - \frac{\sum_{v \in S}(1-\gamma_v)}{n^2}\left(\Gamma + \sum_{v \in S}(1-\gamma_v) - 2\mathbb{I}(S)\right).$$

Because most of seed sets in most social network data set have small influences, namely, $$\mathbb{I}(S) \ll \frac{\Gamma}{2},$$

it can be established that $\Gamma+\Sigma_{v\in S}(1-\gamma_v)-2\mathbb{I}(S)\gg 0$. Thus, it can be observed that $\mathrm{Var}[Z_j(S)]<\mathrm{Var}[Y_j(S)]$ holds for most seed sets.

Better Concentrations of SKIS Random Variables. Further, it can be observed that concentration properties of SKIS sketches are better than those in the art. Another variance of $Z_j(S)$ can be determined by observing that $$Z_j(S) \in \left[ \frac{\sum_{v\in S}(1-\gamma_v)}{n}, \frac{\Gamma+\sum_{v\in S}(1-\gamma_v)}{n} \right]$$

in which the variance $\mathrm{Var}[Z_j(S)]$ can satisfy an certain inequality as defined in Equation 15.

$$\mathrm{Var}[Z_j(S)] \le \frac{\mathbb{I}(S)}{n}\frac{\Gamma}{n} \quad \text{(Equation 15)}$$

Using Equation 15 with the general form of Chernoff's bound by the sample space of $\Omega_{SKIS}$, concentration inequalities for random variables $Z_j(S)$ of SKIS sketch can be derived per Equations 16 and 17 in which a SKIS sketch $\mathcal{R}=\{R_1, \ldots, R_T\}$ with random variables $Z_1(S), \ldots, Z_T(S)$.

$$\Pr\left[ \frac{\sum_{j=1}^{T} Z_j(S)}{T} n - \mathbb{I}(S) \ge \epsilon\mathbb{I}(S) \right] \le \exp\left( \frac{-\epsilon^2 T}{2\frac{\Gamma}{n}+\frac{2}{3}\epsilon} \frac{\mathbb{I}(S)}{n} \right) \quad \text{(Equation 16)}$$

$$\Pr\left[ \frac{\sum_{j=1}^{T} Z_j(S)}{T} n - \mathbb{I}(S) \ge \epsilon\mathbb{I}(S) \right] \le \exp\left( \frac{-\epsilon^2 T}{2\frac{\Gamma}{n}} \frac{\mathbb{I}(S)}{n} \right) \quad \text{(Equation 17)}$$

Compared with the bounds for RIS sketch in Corollaries 1 and 2 as described in Tang et al., "Influence Maximization in Near-Linear Time: A Martingale Approach," in SIGMOD, pp. 1539-1554 (2015), the concentration bounds for SKIS sketch in Equations 16 and 17 are stronger, i.e., tighter. Notably, the denominator of the exp(.) has a factor of $\Gamma/n$ in the denominator, whereas, the factor for a RIS random variable is merely "1".

Discussion

Reverse Influence Sketch. As a background on reverse influence sketch (RIS), following a diffusion model, a random RIS sample (denoted by $Q_j$) contains a randomly generated set of nodes that can influence a randomly selected source node (denoted by $src(Q_j)$). A RIS sample is generated, in some embodiments, in three steps: 1) select a random node $v\in V$ which serves as $src(Q_j)$; 2) generate a sample graph $g\sim G$; and 3) return the set $Q_j$ of nodes that can reach v in g. Thus, the probability of generating a particular RIS sample $Q_j$ can be computed based on the source selection and the sample graphs that has $Q_j$ as the set of nodes that can reach $src(Q_j)$ in g as shown in Equation 18. Let denote such set of nodes that can reach to a node v in sample graph g by $\eta_g$—(v). We have, $$\Pr[R_j] = \frac{1}{n} \sum_{g,\eta_g(src(R_j))=R_j} \Pr[g] \quad \text{(Equation 18)}$$

A key property of RIS for estimating the influence is that the probability of a random RIS intersecting with the set S is proportional to S influence.

It can be shown that for a given random RIS sample $R_j$ generated from $\mathcal{G}=(V, E, w)$ for a set $S\subseteq V$ of nodes, the expected influence $\hat{\mathbb{I}}_\mathcal{R}(S)=n\cdot\Pr[R_j\cap S\ne\emptyset]$. To this end, estimating and/or maximizing $\hat{\mathbb{I}}_\mathcal{R}(S)$ can be equivalent to estimating and/or maximizing the probability $\Pr[R_j\cap S\ne 0]$ to which a general strategy for influence estimation (IE) and/or influence maximization (IM) can be based on the generating a set of RIS samples, and then returning an empirical estimate of $\Pr[R_j\cap S\ne 0]$ on generated samples for IE or the set $\hat{S}_k$ that intersects with most samples for IM. One strong advantage of RIS is the reuse of samples to estimate influence of any seed sets $S\subseteq V$.

Though, in real-world networks, it is observed that most of the nodes have small influences to the other nodes or the edge weights are commonly very small, thus, the majority of RIS samples contain only a single node which is the randomly selected source $src(Q_j)$. These RIS samples containing only the sources are termed singular. Because the singular samples are wasted in estimating the influences, at least, for at least two reasons that they do not contribute to influences of other seed sets nor do they contribute to influence of seed sets that contain its source $src(Q_j)$. Indeed, large portion of singular RIS samples can be ignored to reduce the huge burden that they present in generation and storage.

It can be shown that the probability $\Pr[R_j\in\Omega_{SKIS}]$ of generating a non-singular sample from sampling space $\Omega_{SKIS}$ as compared to the sampling space $\Omega_{RIS}$. Let $\Omega_{RIS}$ be the sampling space of reverse influence samples (RIS) with probability $\Pr[R_j\in\Omega_{RIS}]$ of generating sample Rj. Let $\Omega_{SKIS}$ be a subspace of $\Omega_{RIS}$ and corresponds to the space of only non-singular reverse influence samples in $\Omega_{RIS}$. Since $\Omega_{SKIS}$ is a subspace of $\Omega_{RIS}$, the probability $\Pr[R_j\in\Omega_{SKIS}]$ of generating a non-singular sample from $\Omega_{SKIS}$ is larger than $\Omega_{RIS}$. Specifically, for anode $v\in V$, let $\gamma_v$ be a probability of generating a non-singular sample if v is selected as the source and $\Gamma=\Sigma_{u\in V}\gamma_v$. To this end, when the samples sources are selected randomly, the ratio of generating a non-singular sample to generating any sample in $\Omega_{RIS}$ is $\Gamma/n$ and, thus, the probability $\Pr[R_j\in\Omega_{SKIS}]$ can be expressed as $$\frac{n}{\Gamma}\Pr[R_j\in\Omega_{RIS}]$$

in which $\Pr[R_j\in\Omega_{SKIS}]$ is determined by Equation 19.

$$\Pr[R_j] = \sum_{v\in V}\Pr[src(R_j)=v]\Pr[\text{generate } R_j \text{ from } v] \quad \text{(Equation 19)}$$

$$= \sum_{v\in V}\frac{\gamma_v}{\Gamma}\frac{\Pr[R_j\in\Omega_{RIS} \text{ and } src(R_j)=v]}{\gamma_v}$$

$$= \frac{n}{\Gamma}\sum_{v\in V}\frac{1}{n}\Pr[R_j\in\Omega_{RIS} \text{ and } src(R_j)=v]$$

-continued $$= \frac{n}{\Gamma} \Pr[R_j \in \Omega_{RIS}] = \Pr[R_j \in \Omega_{SKIS}]$$

Independent Cascade Model and Definitions. A background of Independent Cascade (IC) model is now provided for modeling the diffusion of information in networks. Two essential problems of Influence Estimation and Maximization are formally stated.

Let consider a social network abstracted as a probabilistic graph $\mathcal{G} = (V, E, w)$. Each edge $(u, v) \in E$ is associated with a real number $w(u, v) \in [0,1]$ specifying the probability that node u will successfully influence v once u is influenced.

For a subset of nodes $S \subseteq V$, called seed set, the influence propagation from S happens in discrete rounds $t=0, 1, \ldots$, and so forth. At round 0, only nodes in S are active (i.e., influenced) and the others are inactive. Each newly activated node u at round t will have a single chance to activate each neighbor v of u with probability $w(u, v)$. An activated node remains active till the end of the diffusion propagation. The process stops when no more nodes get activated.

Sample Graphs. Once a node u gets activated it will activate each of its neighbor v with probability $(u, v)$. This can be thought of as flipping a biased coin that gives head with probability $w(u, v)$ to determine whether the edge $(u, v)$ exists. If the coin lands head for the edge $(u, v)$, the activation occurs and we call $(u, v)$ a live-edge. Since all the influences in the independent cascade (IC) model are independent, it does not matter when coins are flipped to determine the states of the edges. Thus, all the coins can be flipped at the beginning instead of waiting until u gets activated. The deterministic graph g that contains all the live-edges can be called a sample graph of G.

Probabilistic Space. Thus G can be seen as a generative model. The set of all sample graphs generated from G together with their probabilities define a probabilistic space $\Omega_G$. Each sample graph $g \in \Omega_G$ can be generated by flipping coins on all the edges to determine whether or not the edge is live or appears in g. That is each edge $(u, v)$ will be present in the a sample graph with probability $w(u, v)$. Therefore, a sample graph $g=(V, E^o \subseteq E)$ is generated from G with a probability $\Pr[g \sim G]$ calculated by Equation 20.

$$\Pr[g \sim \mathcal{G}] = \prod_{(u,v) \in E'} \omega(u, v) \prod_{(u,v) \notin E'} (1 - \omega(u, v)) \quad \text{(Equation 20)}$$

Influence Spread. Given the diffusion model, the popular measure Influence Spread (or simply influence) of a seed set S is defined as the expected number of active nodes in the end of the diffusion propagation, where the expectation is taken over the probabilistic space $\Omega_G$. Given a sample graph $g \sim G$ and a seed set $S \subset V$, $\eta_g(S)$ is denoted as the set of nodes reachable from S (including nodes in S themselves). The influence spread of S is defined per Equation 21.

$$\mathbb{I}(S) = \sum_{g \sim \mathcal{G}} |\eta_g(S)| \Pr[g \sim \mathcal{G}] \quad \text{(Equation 21)}$$

Proof of Connection Between IIS Samples and Expected Influence. Given a stochastic graph $\mathcal{G}$, recall that $\Omega_{\mathcal{G}}$ is the space of all possible sample graphs $g \sim \mathcal{G}$ and $\Pr[g]$ is the probability that g is realized from $\mathcal{G}$. In a sample graph $g \in \Omega_{\mathcal{G}}$, $\eta_g(S, v) = 1$ if v is reachable from S in g. Consider the graph sample space $\Omega_{\mathcal{G}}$, based on a node $v \in V \setminus S$, $\Omega_{\mathcal{G}}$ can be divided into two partitions: 1) $\Omega_{\mathcal{G}}^\emptyset(v)$ contains those samples g in which v has no incoming live-edges; and 2) $\bar{\Omega}_{\mathcal{G}}^\emptyset(v) = \Omega_{\mathcal{G}} \setminus \Omega_{\mathcal{G}}^\emptyset$. We start from the definition of influence spread as Equation 22.

$$\mathbb{I}(S) = \sum_{v \in V} \sum_{g \in \Omega_{\mathcal{G}}} \eta_g(S, v) \Pr[g] \quad \text{(Equation 22)}$$

$$= \sum_{v \in V} \left( \sum_{g \in \Omega_{\mathcal{G}}^\emptyset(v)} \eta_g(S, v) \Pr[g] + \sum_{g \in \bar{\Omega}_{\mathcal{G}}^\emptyset(v)} \eta_g(S, v) \Pr[g] \right)$$

In each $g \in \Omega_{\mathcal{G}}^\emptyset(v)$, the node v does not have any incoming nodes, thus, $\eta_g(S,v)=1$ only if $v \in S$. Thus, we $\sum_{v \in V} \sum_{g \in \Omega_{\mathcal{G}}^\emptyset(v)} \eta_g(S,v) \Pr[g]$ have that $= \sum_{v \in S} \sum_{g \in \Omega_{\mathcal{G}}^\emptyset(v)} \Pr[g]$.

Furthermore, the probability of a sample graph which has no incoming live-edge to v is $\sum_{g \in \Omega_{\mathcal{G}}^\emptyset(v)} \Pr[g] = 1 - \gamma_v$. Combine with the above equation of $\mathbb{I}(S)$, the follow is obtained:

$$\mathbb{I}(S) = \sum_{v \in S} (1 - \gamma_v) + \sum_{v \in V} \sum_{g \in \bar{\Omega}_{\mathcal{G}}^\emptyset(v)} \eta_g(S, v) \Pr[g \in \Omega_{\mathcal{G}}].$$

Since the instant IIS sketching algorithm generates samples corresponding to sample graphs from the set $\bar{\Omega}_{\mathcal{G}}^\emptyset(v)$, we define $\bar{\Omega}_{\mathcal{G}}^\emptyset(v)$ to be a graph sample space in which the sample graph $\bar{g} \in \bar{\Omega}_{\mathcal{G}}^\emptyset(v)$ has a probability $$\Pr[\bar{g} \in \bar{\Omega}_{\mathcal{G}}^\emptyset(v)] = \frac{\Pr[\bar{g} \in \Omega_{\mathcal{G}}]}{\gamma_v}$$

of being realized (since $\sum_{g \in \bar{\Omega}_{\mathcal{G}}^\emptyset(v)} \Pr[\bar{g} \in \Omega_{\mathcal{G}}] = \gamma_v$ is the normalizing factor to fulfill a probability distribution of a sample space). Then, $\mathbb{I}(S)$ rewritten as Equation 23.

$$\mathbb{I}(S) = \sum_{v \in V} \sum_{g \in \bar{\Omega}_{\mathcal{G}}^\emptyset(v)} \eta_g(S, v) \frac{\Pr[g \in \Omega_{\mathcal{G}}]}{\gamma_v} \gamma_v + \sum_{v \in S} (1 - \gamma_v) \quad \text{(Equation 23)}$$

$$= \sum_{v \in V} \sum_{\bar{g} \in \bar{\Omega}_{\mathcal{G}}^\emptyset(v)} \eta_{\bar{g}}(S, v) \Pr[\bar{g} \in \bar{\Omega}_{\mathcal{G}}^\emptyset(v)] \gamma_v + \sum_{v \in S} (1 - \gamma_v)$$

Now, from the node v in a sample graph $\bar{g} \in \bar{\Omega}^0{}_G(v)$, a IIS sketch $R_j(\bar{g}, v)$ starting from v and contains all the nodes that can reach v in $\bar{g}$. Thus, $\eta_{\bar{g}}(S,v) = 1_{R_j(\bar{g},v) \cap S \neq \emptyset}$ where $1_x$ is an indicator function returning 1 iff $x \neq 0$. The result is then showed in Equation 24.

$$\sum_{\bar{g} \in \bar{\Omega}_{\mathcal{G}}^\emptyset(v)} \eta_{\bar{g}}(S, v) \Pr[\bar{g} \in \bar{\Omega}_{\mathcal{G}}^\emptyset(v)] = \quad \text{(Equation 24)}$$

-continued $$\sum_{g \in \Omega_G^\phi(v)} 1_{R_j(g,v) \cap S \neq \phi} \Pr[\overline{g} \in \overline{\Omega}_G^\phi(v)] = \Pr[R_j(v) \cap S \neq \phi]$$

where $R_j(v)$ is a random IIS sketch with $src(R_j(v))=v$. Plugging this back in to the computation of $\mathbb{I}(S)$ gives a completion of the proof as shown in Equation 25.

$$\mathbb{I}(S) = \sum_{v \in V} \Pr[R_j(v) \cap S \neq \phi]\gamma_v + \sum_{v \in S}(1-\gamma_v) \quad \text{(Equation 25)}$$

$$= \sum_{v \in V} \Pr[R_j(v) \cap S \neq \phi]\frac{\gamma_v}{\Gamma} + \sum_{v \in S}(1-\gamma_v)$$

$$= \sum_{v \in V} \Pr[R_j(v) \cap S \neq \phi]\Pr[src(R_j) = v]\Gamma + \sum_{v \in S}(1-\gamma_v)$$

$$= \Pr[R_j \cap S \neq \phi] \cdot \Gamma + \sum_{v \in S}(1-\gamma_v)$$

Experimental Results

A set of experiments has been conducted on estimation and maximization problems to evaluate advantages of SKIS sketches and methodologies disclosed herein, including experiments based on the independent cascade (IC) model and the linear threshold (LT) model. Table 1 lists a summary of the data sets evaluated, which includes size ranging from tens of thousands to as large as 65.6 million nodes and 3.6 billion edges.

TABLE 1

| Dataset | #Nodes | #Edges | Avg Degree |
|---|---|---|---|
| NetPHY | $0.037 \times 10^6$ | $0.181 \times 10^6$ | 9.8 |
| Epinions | $0.075 \times 10^6$ | $0.841 \times 10^6$ | 22.4 |
| DBLP | $655 \times 10^3$ | $2 \times 10^6$ | 6.1 |
| Orkut | $3 \times 10^6$ | $234 \times 10^6$ | 78.0 |
| Twitter | $41.7 \times 10^6$ | $1.500 \times 10^6$ | 70.5 |
| Friendster | $65.6 \times 10^6$ | $3.600 \times 10^6$ | 109.6 |

With respect to influence estimation, the results of the SKIS sketch is compared to a number of algorithms, including RIS (e.g., as described in Borgs et al., "Maximizing social influence in nearly optimal time," in SODA. SIAM, pp. 946-957 (2014)) and Combined Reachability Sketch (SKIM) (e.g., as described in Cohen et al., "Sketch-based influence maximization and computation: Scaling up with guarantees," in CIKM. ACM, pp. 629-638 (2014). In SKIM, default parameters include setting k=l=64. Further, the SKIM algorithm is modified to read graphs from files rather than being internally computed. The samples in SKIS and RIS were generated until the total size of all the samples reached h·n log n where h is a constant set in the set $\{5, 10\}$.

With respect to influence maximization, three algorithms were evaluated in comparison to SKIS, including PMC (a Monte-Carlo simulation pruned method with no guarantees described in Ohsaka et al., "Fast and accurate influence maximization on large networks with pruned monte-carlo simulations," in AAAI (2014)), IMM (a RIS-based algorithm with quality guarantees described in Tang et al., "Influence maximization in near-linear time: A martingale approach," in SIGMOD, pp. 1539-1554 (2015)), DSSA (a fast RIS-based algorithm with approximation guarantee described in Nguyen et al., "Stop-and-stare: Optimal sampling algorithms for viral marketing in billion-scale networks," in SIGMOD, ACM, pp. 695-710 (2016)), and DSSA+SKIS (a modified version of DSSA where SKIS sketch is adopted to replace RIS). In IMM, DSSA, and DSSA+SKICS, parameters c is set as 0.5 and $\delta=1/n$. For PMC, the default parameter of 200 DAGs is used.

The algorithms were implemented in C++ and the experiments were conducted on a CentOS machine with Intel Xeon E5-2650 v3 2.30 GHz CPUs and 256 GB RAM. The ground-truths for the experiments were computed on a cluster of 16 CentOS machines, each with 64 Intel Xeon CPUs X5650 2.67 GHz and 256 GB RAM.

FIG. 4 shows a table of average relative differences among the different algorithms evaluated for solution quality, running time and memory. As shown in FIG. 4, SKIS, SKRIS, and SKIM are evaluated via the 6 data sets under both the weighted cascade ("WC") model and the trivalency ("TRI") model for different values of h and |S| and the average relative difference are presented in which the relative difference is defined as $$\frac{|\hat{\mathbb{I}}(S) - \mathbb{I}(S)|}{\max\{\mathbb{I}(S), \hat{\mathbb{I}}(S)\}} \cdot 100\%.$$

where $\mathbb{I}(S)$ is the "ground-truth" influence of S and $\hat{\mathbb{I}}(S)$ is an estimate of influence.

It is noted that SKIS generally returns the lowest error in most instances. As shown in FIG. 4, "dnf" means that the simulation "did not finish" within a 24-hour simulation run. In the weighted cascade model, the weight of the edges w(u, v) is inversely proportional to the in-degree of node v, $d_{in}(v)$ in which $w(u, v)=1/d_{in}(v)$. In the trivalency model, the weight w(u, v) is selected randomly from the set $\{0.1, 0.01,$ and $\{0.001\}$.

Solution Quality, Computation Time, Memory Use. It is observed that the SKIS algorithm had consumed much less time and memory space as compared to RIS and SKIM while producing better solution quality. FIGS. 4-8 present the quality solutions comparisons among the SKIS algorithm and other algorithms. FIG. 9 present the computing time and memory use comparisons among the SKIS algorithm and other algorithms.

Solution Quality. FIGS. 4-8 present the relative estimation errors for the three sketch algorithms. As shown in FIG. 4, the errors of SKIS are about 110% and 400% smaller than those of RIS for a value of k=1 while being as good as or better than RIS for values of k=100 and 1000. SKIM showed the largest estimation errors in most of the cases. In some instances, SKIM's error is more than 60 times higher than SKIS and RIS, e.g., on the Twitter data when |S|=100. Similar results were observed under the trivalency model. Further results have been published in Nguyen et al., "Importance Sketching of Influence Dynamics in Billion-Scale Networks", Conference: 2017 IEEE International Conference on Data Mining (ICDM) (2017), which is incorporated by reference herein in its entirety.

Figure 7:
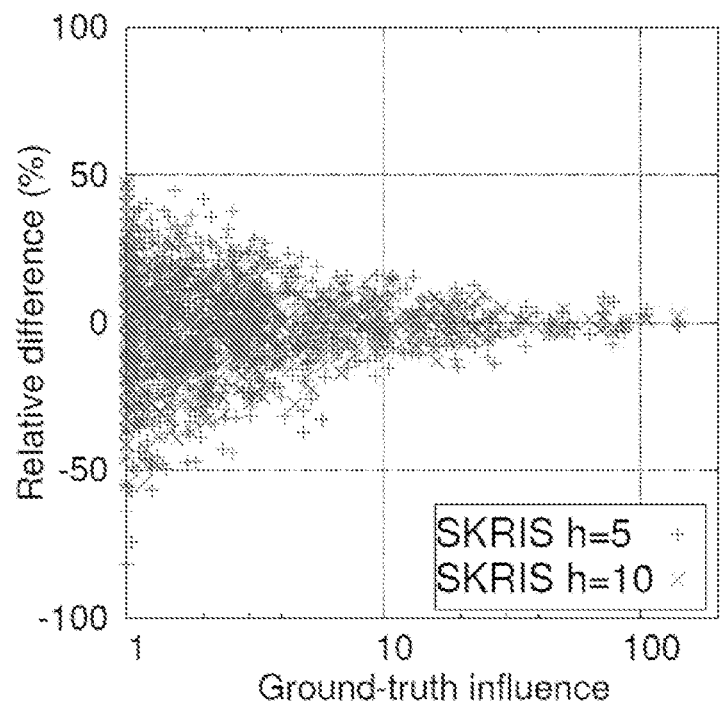
Figure 8:
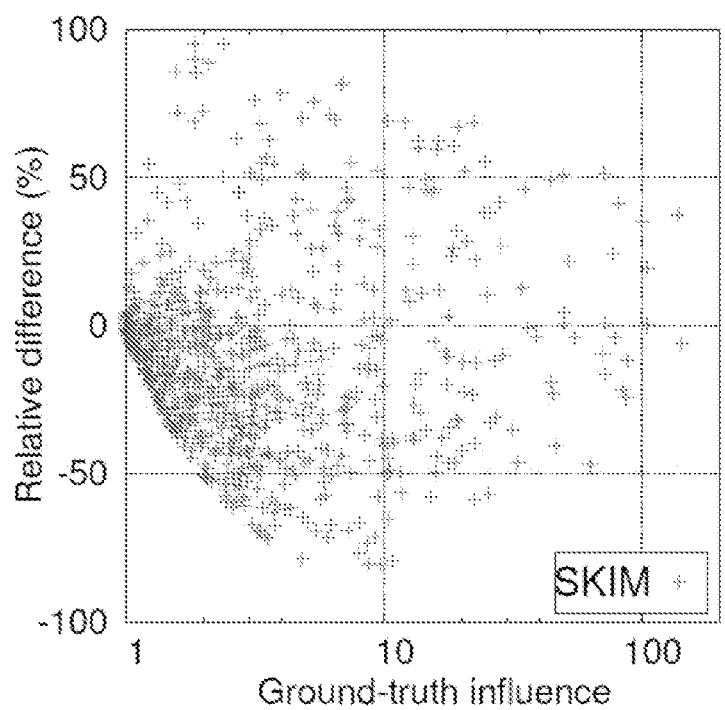

FIG. 5 shows relative difference of performance on the Epinion data set under the trivalency model. FIGS. 6-8 each shows error distributions for estimating influences of random seeds under the weighted cascade model for SKIS, RIS, and SKIM with |S|=1. As shown in FIGS. 6-8, the SKIS algorithm produced the lowest relative errors with a highly concentrated error distribution around 0 while the error distribution of the RIS and SKIM algorithms were widely spread out.

Figure 10:
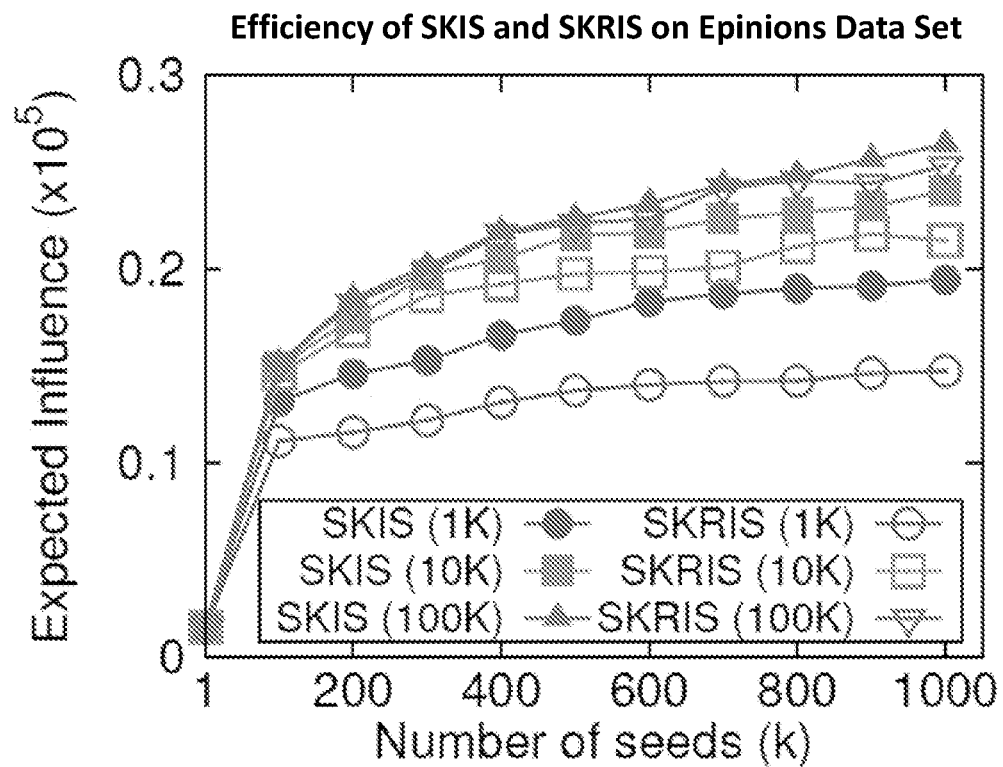
Figure 11:
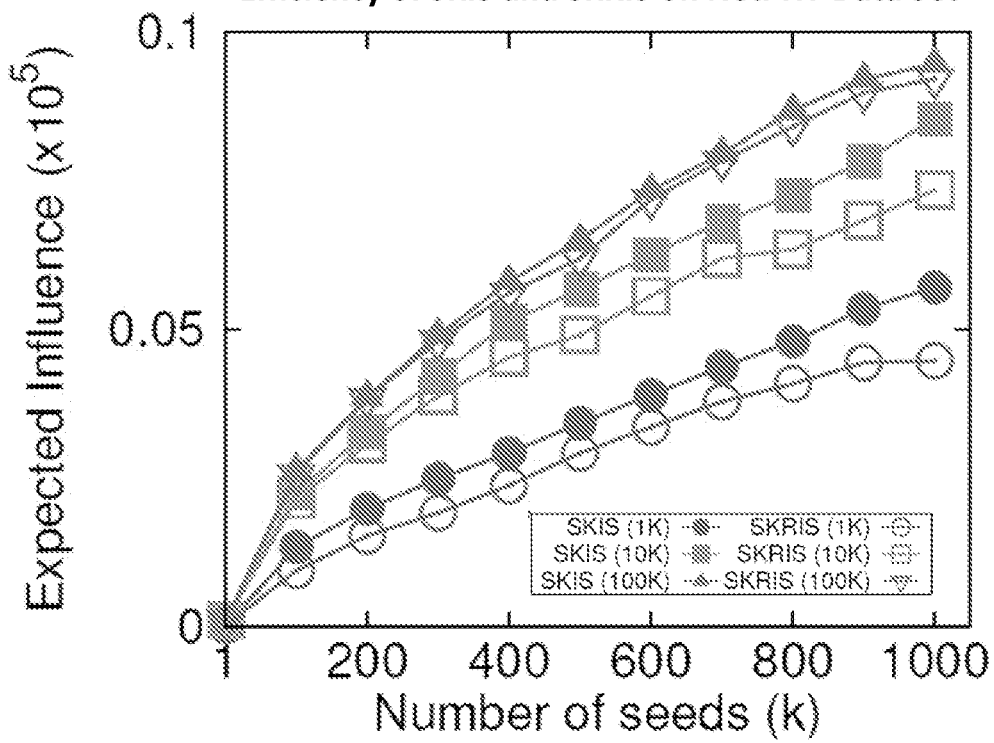
Figure 12:
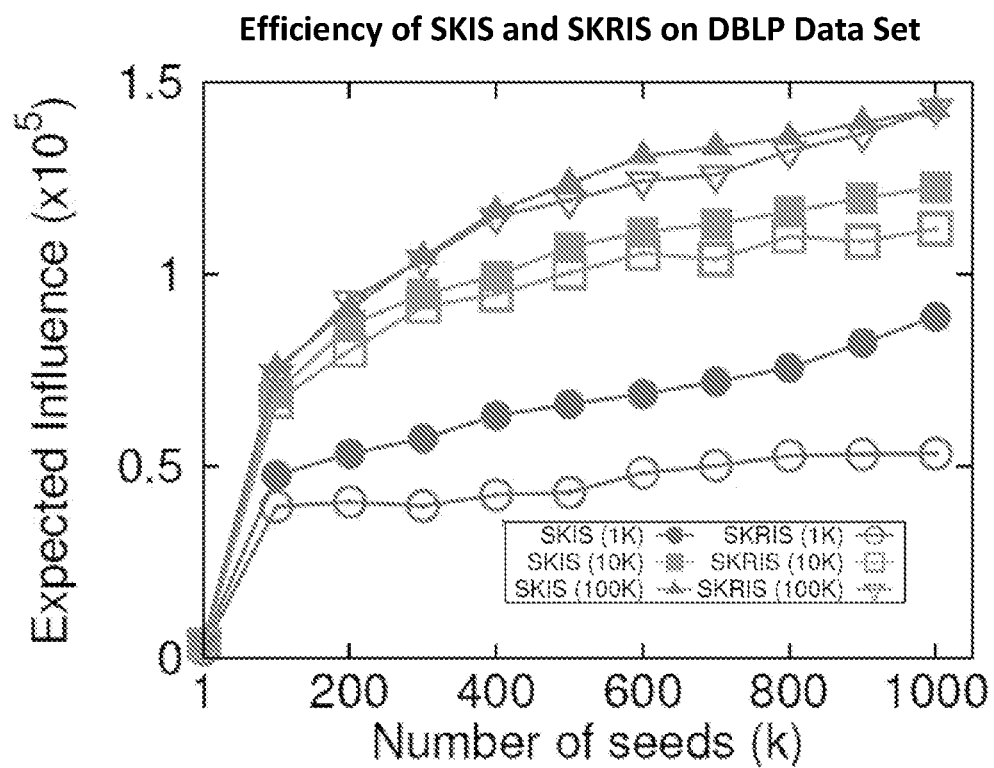
Figure 13:
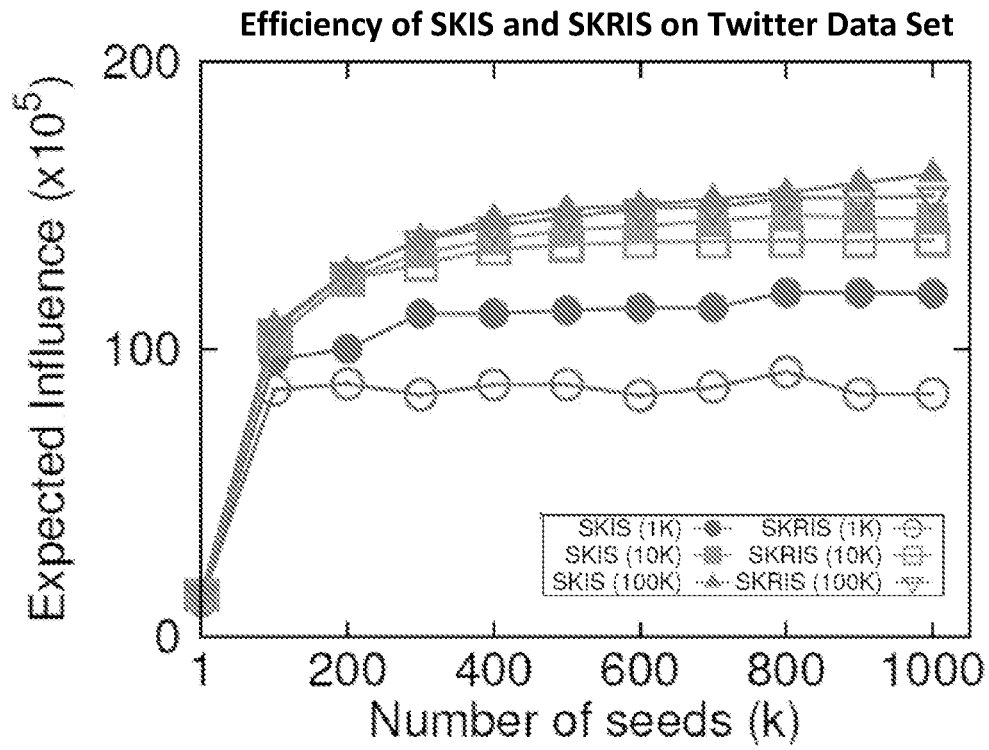

FIGS. 9 and 10 show a table of reporting indexing performance (e.g., to construct a sketch) and memory performance among the different sketch algorithms. As shown, the SKIS and RIS algorithm used about the same amount of time and memory as compared to that of SKIM.

Indexing Time. The SKIS and RIS algorithms used about the same amount of time to build the sketches while SKIM algorithm was slower and had failed to process large networks in both edge models. On larger networks, the SKIS algorithm ran slightly faster than RIS.

Index Memory. In terms of memory, it is observed that that larger sketches require more time to construct. In all experiments, it was observed that the SKIS algorithm consumed the same or less amount of memory with respect to the RIS algorithm. It was also observed that the SKIM algorithm generally used more memory than SKIS and RIS. In summary, it was observed that the SKIS algorithm consistently achieved better solution quality than both the RIS and SKIM algorithms on all the conditions tested while consuming the same or less time/memory. Further, it was observed that the errors of the SKIS algorithm were highly concentrated around "0". In contrast, it was observed that the RIS algorithm was good at estimating high influence while incurring significant errors for small ranges.

Influence Maximization. FIGS. 10-18 are comparison results of the produced IIS sketch with respect to sketches produced from other algorithms from which the seed set with maximum influence in networks are evaluated. The results show that the IIS samples drastically speed up the influence maximization algorithms, in some instances, by a factor of up to 100×.. The running time for the test are limited to 6 hours and are reported as "n/a" if exceeded such limit.

Identifiability of the Maximum Seed Sets. FIGS. 10-13 shows comparison results of the ability of the new IIS sampling to identify a seed set with maximum influence as compared with traditional RIS sampling methodology. During the evaluation, the number of samples generated to be in the set is fixed to {1000; 10000; 100000} to which a Greedy algorithm is applied to find solutions. The influence of returned seed sets is recomputed using Monte-Carlo method with precision parameters ε=0:005 and δ=1/n.

In FIGS. 10-13, it is observed that IIS sampling methodology typically produce better solutions among various networks, k values, and number of samples as compared to those produced by RIS methods. In some instances, it is observed that the solutions provided by IIS sampling achieve up to 80% better than those produced by other RIS methodology.

Efficiency of SKIS on IM problem. FIG. 18 shows comparison results among the DSSA-SKIS algorithm, the DSSA algorithm, the IMM algorithm, and the PMC algorithm with respect to running time performance, memory consumption performance, and number of samples generated.

Running Time. As shown in FIG. 18, it is observed that the DSSA+SKIS algorithm outperforms the other algorithms under test by significant margins among the various data sets and edge models. It is noted, for example, that the DSSA-SKIS algorithm can execute up to 10 times faster than the original DSSA algorithm. It is further observed that the DSSA+SKIS algorithm was the only algorithm which could run on TRI model of the largest size network that was evaluated.

Figure 14:
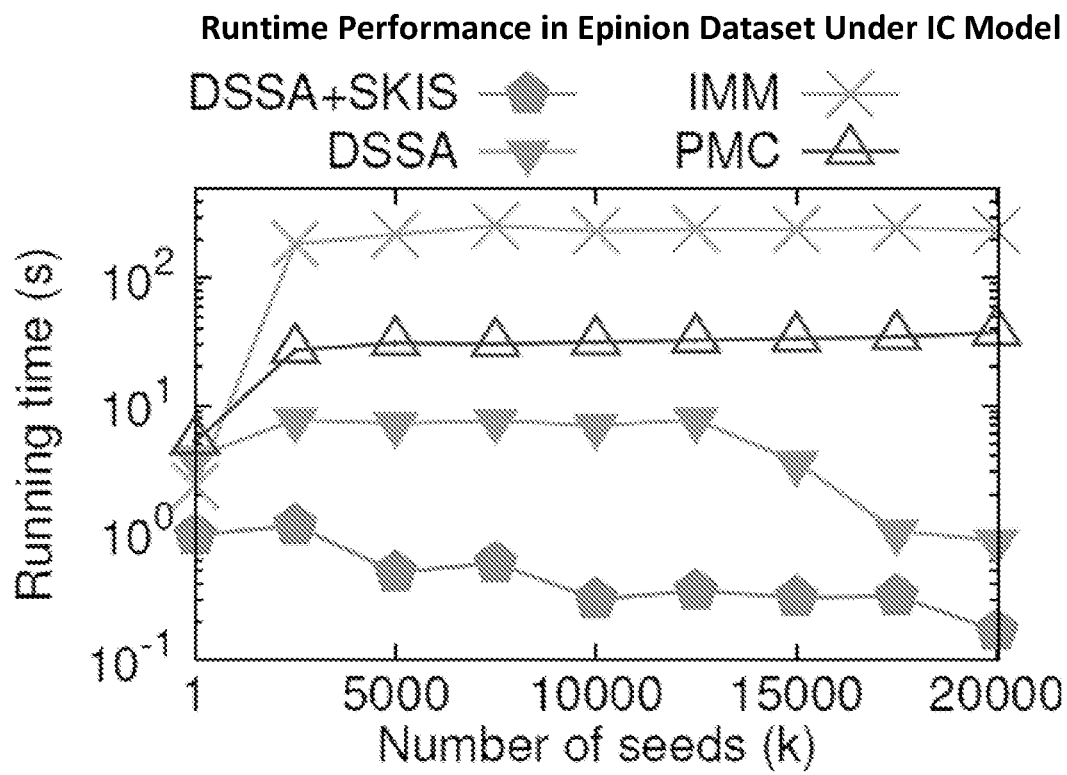
Figure 15:
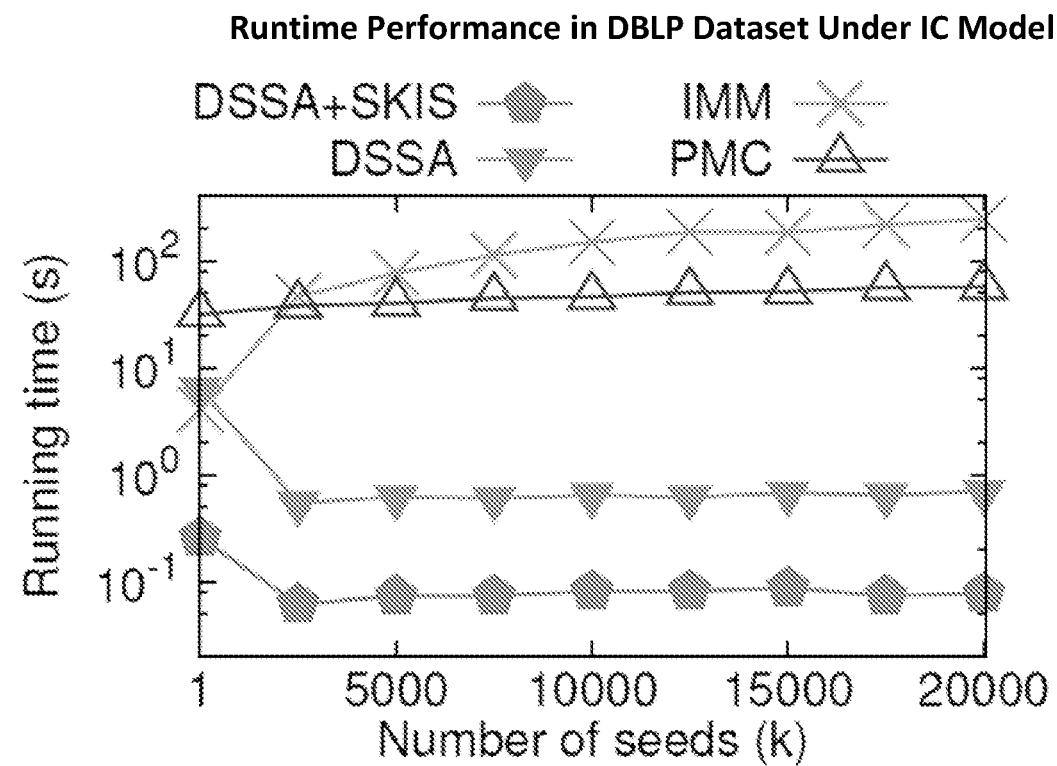

FIGS. 14-15 shows comparison results of the running time performance of the four IM algorithms across a wide range of budget from k=1 to k=20000 under both the IC model and the TRI model. It was observed that the DSSA+SKIS algorithm maintains significant performance gaps to the other algorithms evaluated. In some instances, the DSSA+SKIS algorithm was observed to be 10 times faster than the DSSA algorithm or about 1,000 times faster than the IMM or PMC algorithm.

Number of Samples and Memory Usage. As shown in FIG. 18, similar to running time performance, the memory usage performance and number of samples generated by the DSSA+SKIS algorithm were much less than those of the other algorithms tested. The number of samples generated by the DSSA+SKIS algorithm in some instances were observed to be 10 times fewer than those of the DSSA algorithm for data set using the TRI model and 100 times fewer than those of the IMM algorithm. It is observed that memory performance of the DSSA+SKIS algorithm is a few times better than those of the DSSA and IMM algorithms. In some instances, it was observed that the PMC algorithm was not able to process datasets of the two large networks.

Figure 16:
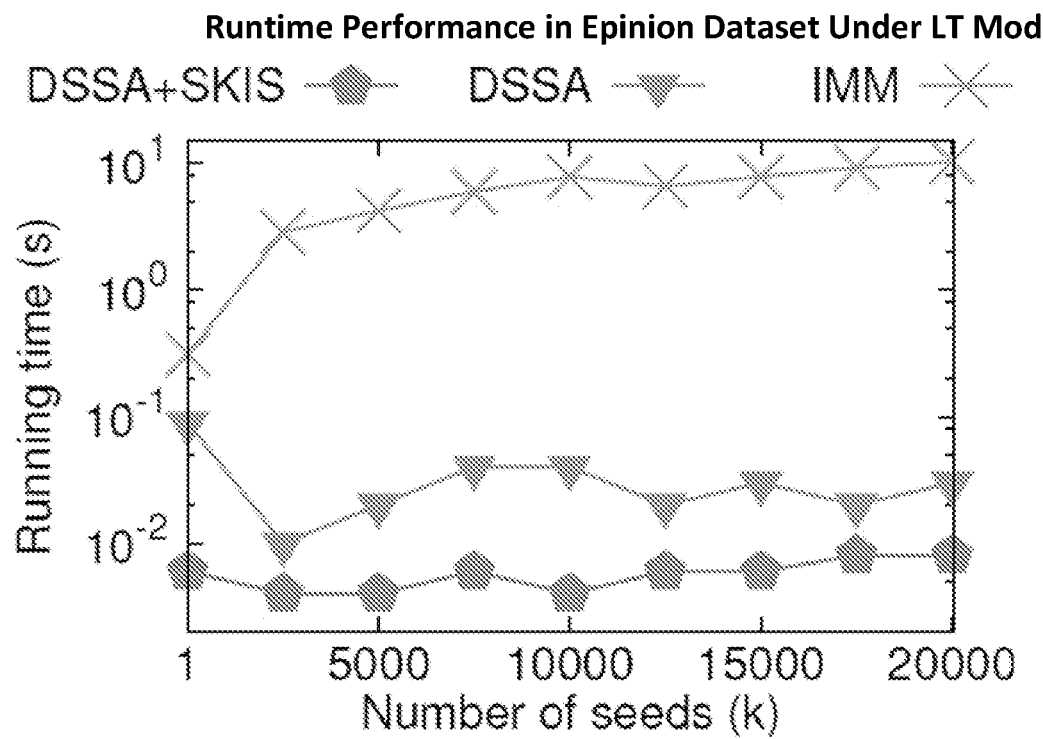
Figure 17:
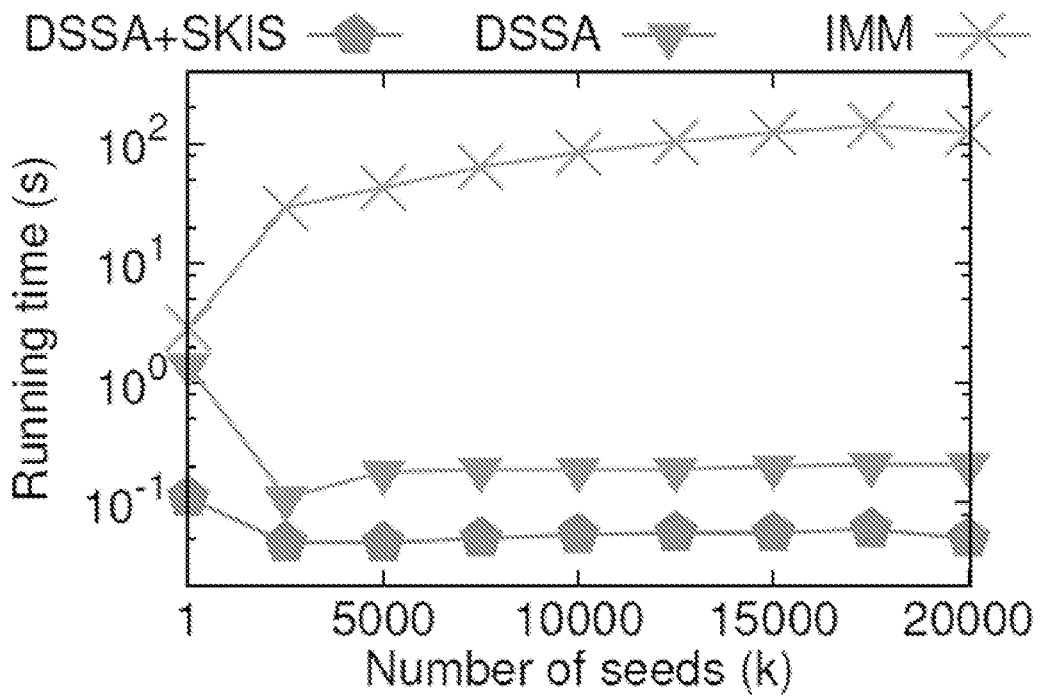
Figure 22:
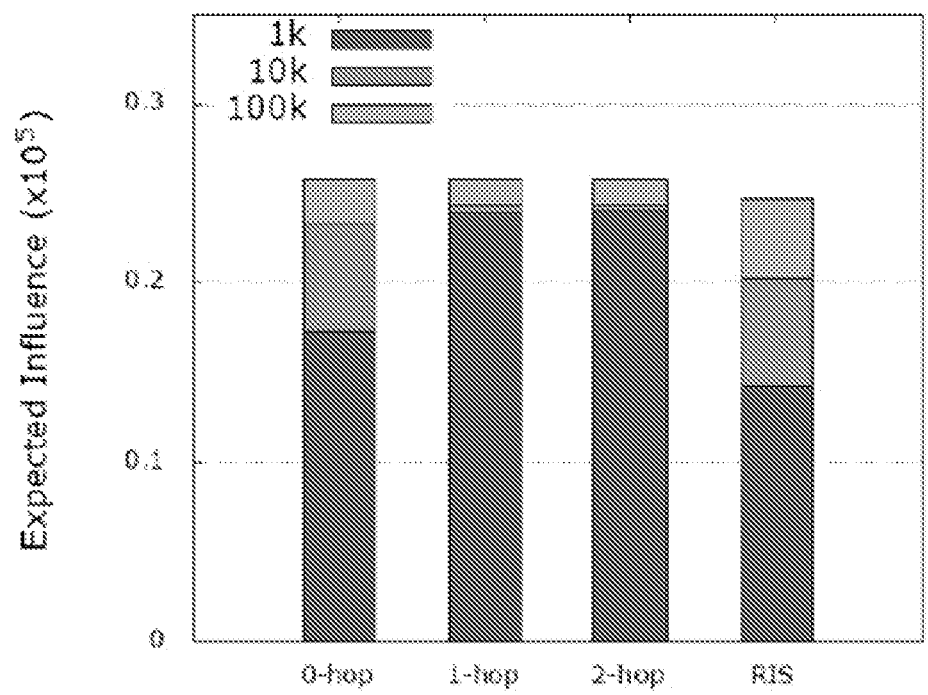
FIGS. 22, 23, 24, and 25 are diagrams showing solution quality, measured as influence spread, for HIS, SKIS, and RIS, in accordance with an illustrative embodiment.
Figure 23:
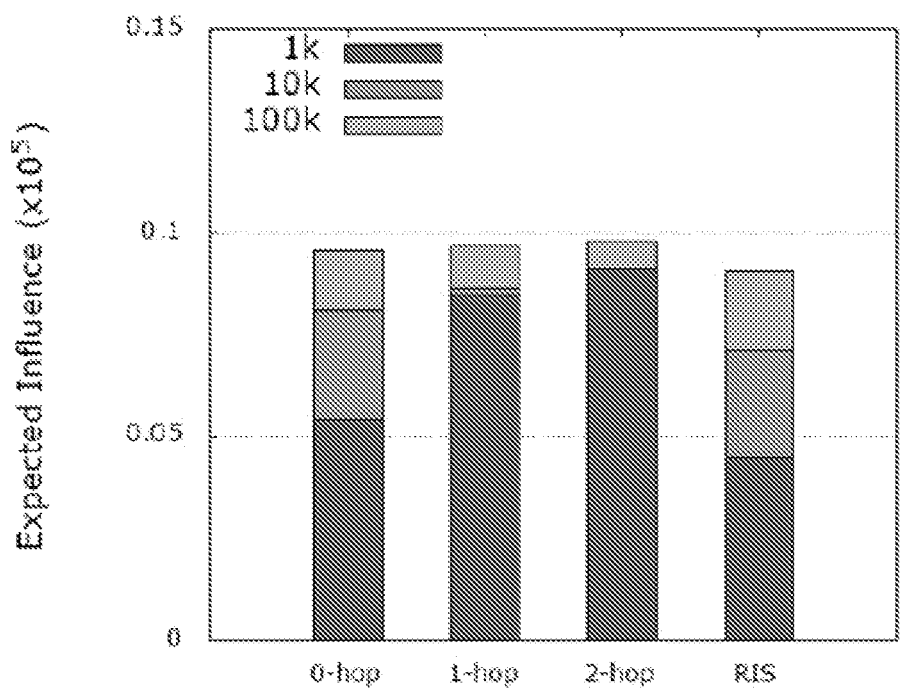
Figure 24:
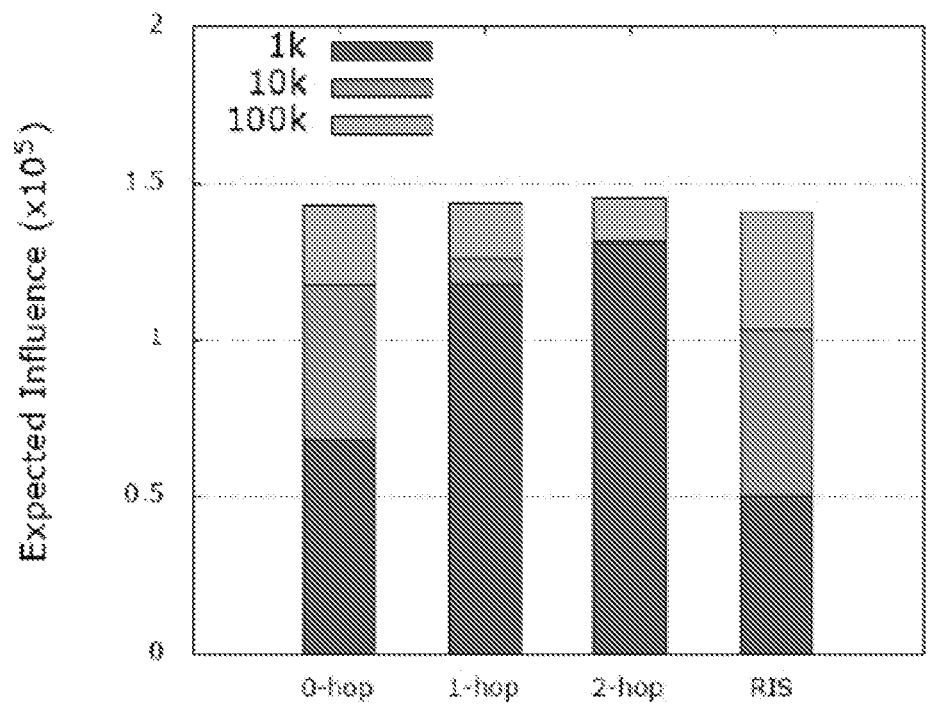
Figure 25:
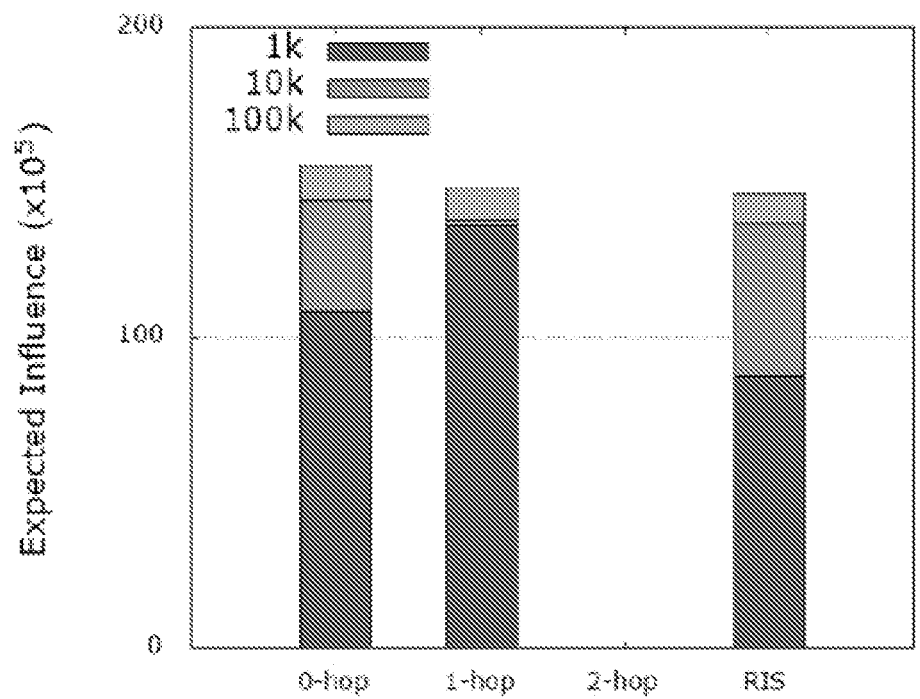

Experiments on the Linear Threshold (LT) model. FIGS. 16 and 17 show runtime performance of the various algorithms in processing datasets under the LT model. Because in the LT model, the total weight of each incoming edge to every node is bounded to "1", the weights are normalized and scaled by a random number generated in a range between "0" and "1". It is observed that the performance of the DSSA+SKIS algorithm in the LT model is similar to those in the IC model. The DSSA+SKIS algorithm has better running time performance.

Application of SKIS to Other Algorithms for Influence Estimation and Influence Maximization Problems In addition to reverse influence sketch (RIS) methodologies, the exemplified methods and systems can be applied to broad class of RIS-based methods to largely improve the efficiency of IM algorithms. It is shown that for a given SKIS sketch having IIS samples, it could be found $S_k$ of k nodes that maximizes $\hat{\mathbb{E}}_\mathcal{R}(S_k)$ by adopting greedy algorithms to obtain an $(1-(1-1/k)^k$-approximate solution over the SKIS sketch. Because SKIS sketch can be used in a greedy algorithm with approximation ratio of $(1-(1-1/k)^k$, it can be combined with other algorithms having such approximation ratios. Further, it could be determined the number of IIS samples in the SKIS sketch $\mathcal{R}$ sufficient to guarantee a high-quality solution for IM.

In some embodiments, SKIS can be applied to the RIS algorithm, and modifications thereof, as described in Borgs et al., "Maximizing social influence in nearly optimal time," in SODA. SIAM, pp. 946-957 (2014), which is incorporated by reference herein in its entirety. In some embodiments, SKIS can be applied to the TIM and TIM+ algorithm, and modifications thereof, as described in Yang et al., "Influence maximization: Near-optimal time complexity meets practical efficiency," in SIGMOD. ACM, pp. 75-86 (2014), which is incorporated by reference herein in its entirety. In some embodiments, SKIS can be applied to the IMM algorithm, and modifications thereof, as described in Tang et al., "Influence maximization in near-linear time: A martingale approach," in SIGMOD, pp. 1539-1554 (2015), which is incorporated by reference herein in its entirety. In some embodiments, SKIS can be applied to the BCT algorithm, and modifications thereof, as described in Nguyen et al., "Cost-aware targeted viral marketing in billion-scale networks," in INFOCOM. IEEE, pp. 1-9 (2016), which is incorporated by reference herein in its entirety. In some embodiments, SKIS can be applied to the SSA/DSSA algorithm, and modifications thereof, as described in Nguyen et al., "Stop-and-stare: Optimal sampling algorithms for viral marketing in billion-scale network, in SIGMOD, ACM, pp. 695-710 (2016).

Greedy Algorithm on SKIS Sketches. Let consider the optimization problem of finding a set $S_k$ of at most k nodes to maximize the function $\hat{\mathbb{I}}_\mathcal{R}(S)$ on a SKIS sketch $\mathcal{R}$ of IIS samples under the cardinality constraint $|S| \leq k$. The function $\hat{\mathbb{I}}_\mathcal{R}(S)$ is monotone and submodular since it is a weighted sum of a set coverage function $C_\mathcal{R}(S)$ and a linear term $\Sigma_{v \in S}(1-\gamma_v)$. Thus, for a given set of IIS samples $\mathcal{R}$, the set of function $\hat{\mathbb{I}}_\mathcal{R}(S)$ can be obtained as Equation 26.

$$\hat{\mathbb{I}}_\mathcal{R}(S) = \hat{\mathbb{E}}_\mathcal{R}[Z_j(S)] \cdot n = \frac{C_\mathcal{R}(S)}{|\mathcal{R}|} \cdot \Gamma + \sum_{v \in S}(1-\gamma_v) \quad \text{(Equation 26)}$$

Indeed, a standard greedy scheme can be configured to give an $(1-(1-1/k)^k)$-approximate solution that converges to $(1-1/e)$ asymptotically, approximate solution $\hat{S}_k$. The marginal gain of a node v with respect to a set S on SKIS sketch $\mathcal{R}$ is defined as Equation 27.

$$\text{gain}_\mathcal{R}(v, S) = \frac{\Delta_\mathcal{R}(v, \hat{S}_k)}{|\mathcal{R}|}\Gamma + (1-\gamma_v) \quad \text{(Equation 27)}$$

In Equation 27, $\Delta_\mathcal{R}(v, S)$ is a marginal coverage gain of v with respect to S on the SKIS sketch $\mathcal{R}$. The $\Delta_\mathcal{R}(v, S)$ can be determined as $C_\mathcal{R}(S \cup \{v\}) - C_\mathcal{R}(S)$.

FIG. 19 is a diagram of an example method 1900 to perform a greedy algorithm on SKIS sketches, in accordance with the illustrative embodiment.

As shown in FIG. 19, the main loop of k iterations in lines 2-4 (1902) for a given collection of IIS samples $\mathcal{R}$ and a budget of k. Each iteration picks a node $\hat{v}$ having a largest marginal gain (e.g., as defined in Equation 27) with respect to the current partial solution, $\hat{S}_k$ and adds it to $\hat{S}_k$. The greedy algorithm of FIG. 19 returns an $(1-(1-1/k)^k)$-approximate solution $\hat{S}_k$, as expressed in Equation 28.

$$\hat{\mathbb{I}}_\mathcal{R}(\hat{S}_k) \geq \left(1-\left(1-\frac{1}{k}\right)^k\right)\hat{\mathbb{I}}_\mathcal{R}(S_\mathcal{R}^*) \quad \text{(Equation 28)}$$

In Equation 28, $S_\mathcal{R}^*$ is an optimal cover set of size k on sketch $\mathcal{R}$.

As noted above, because SKIS sketch can be used in a greedy algorithm with approximation ratio of $(1-(1-1/k)^k)$, it can be combined with other algorithms having such approximation ratios.

IMM+SKIS. Tang et al., "Influence Maximization in Near-Linear Time: A Martingale Approach," in SIGMOD, pp. 1539-1554 (2015) provide a theoretical threshold $\theta_{RIS}$ on the number of RIS samples to guarantee an $(1-1/e-\epsilon)$-approximate solution for IM problem with probability $1-\delta$, which can be calculated per Equation 29.

$$\theta_{RIS} = O\left(\left(\log\binom{n}{k} + \log\delta^{-1}\right)\frac{n}{\text{OPT}_k}\epsilon^{-2}\right) \quad \text{(Equation 29)}$$

Replacing RIS with IIS samples to build a SKIS sketch enables use the better bounds as described in relation to Equations 16 and 17. By using the approach of IMM in Tang, "Influence Maximization in Near-Linear Time: A Martingale Approach" with such bounding, it is observed that the threshold of samples to provide the same quality can be reduced to $\theta_{SKIS}$ as provided in Equation 30.

$$\theta_{SKIS} = O\left(\frac{\Gamma+k}{n}\theta_{RIS}\right) \quad \text{(Equation 30)}$$

SSA/DSSA+SKIS. Nguyen et al., "Stop-and-stare: Optimal sampling algorithms for viral marketing in billion-scale network, in SIGMOD, ACM, pp. 695-710 (2016) propose the SSA and DSSA algorithms which implement the Stop-and-Stare strategy of alternating between finding candidate solutions and checking the quality of those candidates at exponential points, i.e., $2^t$ in which $t \geq 1$, to detect a satisfactory solution at the earliest time.

Combining SKIS with SSA or DSSA brings about multiple benefits in the checking step of SSA/DSSA. The benefits stem from the better concentration bounds which lead to better error estimations and smaller thresholds to terminate the algorithms.

One aspect of extending the exemplified techniques to other diffusion models is devising an importance sketching procedure for each model. It is observed that the same, or similar, design principle can be applied to many other diffusion models. Two other equally important and widely adopted diffusion models are now discussed, including the Linear Threshold and the Continuous-time model.

Linear Threshold model. This model imposes a constraint that the total weights of incoming edges into any node $v \in V$ is at most "1", i.e., $\Sigma_{u \in N^{in}(v)} w(u, v) \leq 1$. Every node has a random activation threshold $\lambda_v \in [0,1]$ and gets activated if the total edge weights from active in-neighbors exceeds $\lambda_v$, i.e., $\Sigma_{u \in N^{in}}(v)$, u is active $w(u, v) \leq \lambda_v$. A RIS sampling for LT model can select a random node as the source and iteratively picks at most one in-neighbor of the last activated node with probability being the edge weights, w(u, v). The importance sketching algorithm for the LT model has the following components:

1. Probability of having a non-singular sample per Equation 31.
2. Source sampling rate per Equation 32.
3. Sample a non-singular sample from a source. Select exactly one in-neighbor u of $src(R_j)=_v$ with the probability $$\frac{\omega(u, v)}{\gamma_v}$$

and then follow RIS sampling.

$$\gamma_v = \sum_{u \in N^{in}(v)} \omega(u, v) \quad \text{(Equation 31)}$$

$$\Pr[src(R_j) = v] = \frac{\gamma_v}{\Sigma_{v \in V}\gamma_v} \quad \text{(Equation 32)}$$

Continuous-time model. In the continuous-time model, a deadline parameter T of the latest activation time is specified and each edge (u, v) is associated with a length distribution, represented by a density function $\mathcal{L}_{(u, v)}(t)$, of how long it takes u to influence v. A node u is influenced if the length of the shortest path from any active node at time 0 is at most T. The RIS sampling for the Continuous-time model picks a random node as the source and invokes the Dijkstra's algorithm to select nodes into $src(R_j)$. When the edge (u, v) is first visited, the activation time is sampled following its length distribution $\mathcal{L}_{(u, v)}(t)$. From the length distribution, the probability p(u, v, T) of an edge (u, v) having activation time at most T can be computed per Equation 33.

$$p(u,v,T) = \int_{t=0}^{T} \mathcal{L}_{(u,v)}(t) dt \quad \text{(Equation 33)}$$

The importance sketching procedure for the Continuous-time model has the following components:
1. Probability of having a non-singular sample per Equation 34.
2. Source sampling rate per Equation 35.
3. Sample a non-singular sample from a source. Use a bucket system on p(u, v, T) to select the first in-neighbor u. The activation time of u follows the normalized density function $$\frac{\mathcal{L}(u, v)(t)}{\gamma_v},$$

and then subsequently follow the RIS sampling.

$$\gamma_v = 1 - \prod_{u \in N^{in}(v)} (1 - p(u, v, T)) \quad \text{(Equation 34)}$$

$$\Pr[src(R_j) = v] = \frac{\gamma_v}{\sum_{v \in V} \gamma_v} \quad \text{(Equation 35)}$$

Hop-Based Sketch & Influence Estimation

In another aspect, a hybrid sketching technique is described. In this technique, termed Hop-based Influence Sketch or HIS, the influence of nodes are estimated by adding 1) the exact 'local influence' of S with 2) an estimate of the 'remote influence' of S via the sketch. The exact computation of 'local influence' can help reduce variation in the produced sketch, and increase the estimation accuracy, especially for those of small influence. Even for nodes that do not appear in the RIS sketch due to small influence can be estimated and ranked against each other.

h-hop Estimators. Let $h \in \{0, 1, 2\}$ be a radius of a 'local influence' to be estimated. The h-hop estimator h can be capped at 2 as computing 'local influence' for larger values of h may not be scalable for large networks. It is noted that SKIS can be implemented via a h-hop estimator h=0. The h-hop estimator h is defined in Equation 36.

$$\hat{\mathbb{I}}^{(h)}(S) = l^{(h)}(S) + \hat{r}^{(h)}(S) \quad \text{(Equation 36)}$$

Local influence. $l^{(h)}(S)$ can be defined as the expected numbers of nodes that are activated by S within at most h round(s). It is noted that a hybrid approach that relies on sketch techniques can provide estimation with arbitrary small statistical guarantees. The definition of local influence for h=0, 1, and 2 are as follows.

Case h=0. The local influence can be expressed as Equation 37.

$$l^{(0)}(S) = |S| \quad \text{(Equation 37)}$$

Case h=1. Denote by D(S,h) the set of nodes at distance h from S and $\pi_h(u)$ is the probability that u gets activated (for the first time) at round h. To this end, $\pi_1(S, u)$ can be expressed in Equation 38.

$$\pi_1(S, u) = 1 - \prod_{s \in S, (s,u) \in E} (1 - p(s, u)) \forall u \in D(S, 1) \quad \text{(Equation 38)}$$

The local influence of S within 1 hop can be further expressed in Equation 39.

$$l^{(1)}(S) = l^{(0)} + \sum_{u \in D(S,1)} \pi_1(S, u) \quad \text{(Equation 39)}$$

Case h=2. Similarly, the local influence of S within 2 hop can be expressed in Equation 40.

$$l^{(2)}(S) = l^{(1)} + \sum_{u \in D(S,1) \cup D(S,2)} \pi_2(v) \quad \text{(Equation 40)}$$

In Equation 40, $\pi_2(S, v)$ can be expressed in Equation 41 in which $\pi_1(S, v) = 0$ for $v \in D(S, 2)$.

$$\pi_2(S, v) = (1 - \pi_1(S, v)) \left(1 - \prod_{(u,v) \in E} (1 - \pi_1(S, u) p(u, v))\right) \quad \text{(Equation 41)}$$

Remote influence. The remote influence is estimated on a same set of reverse reachability sets generated in RIS sketch. The difference is that each sample $R_j \in S$ is split into two subsets $R_j^{(h)}$ and $R_j^{(h+)}$ in which $R_j^{(h)}$ contains nodes in $R_j$ that are at most h hops away from its source node, and $R_j^{(h+)}$ contains nodes in $R_j$ that are more than h hops away from its source node.

The estimator for remote influence is then defined in Equation 42.

$$\hat{r}^{(h)}(S) = \frac{1}{T} \sum_{j=1}^{T} R_j^{(h+)} \cap S \neq \phi \text{ AND } R_j^{(h)} \cap S = \phi \quad \text{(Equation 42)}$$

Indeed, only samples that can be reached to some node in S in more than h hops are counted. In this manner, it is ensured that only the 'remote influence' is accounted for.

Statistical guarantee on estimation error. The hybrid estimation can be considered as an unbiased estimator for nodes' influence. For $h \in \{0, 1, 2\}$, a seed set $S \subseteq V$, and a random reachability set $R_j = (R_j^{(h)}, R_j^{(h+)})$, the expected influence $\mathbb{I}(s)$ can be expressed in Equation 43.

$$\mathbb{I}(S) = l^{(h)}(S) + Pr[R_j^{(h+)} \cap S \neq \emptyset \text{ AND } R_j^{(h)} \cap S = \emptyset] \quad \text{(Equation 43)}$$

Memory saving. Because only samples $R_j$ that $R_j^{(h+)}$ intersects with the seed set S are counted, any samples $R_j$ with $R_j^{(h+)} = \emptyset$ can be safely discarded from the sketch. For a network with small edge probabilities, this can result in significant saving in memory.

Time vs. accuracy trade-off. For larger value of h, a better estimation for the 'local influence' can result and, thus, a more robust estimation for nodes with small influence. However, a larger h can also result in more computing time.

In our experiments, h>1 may not be practical for large networks with billions of edges.

Experimental Results

Experiments was conducted using real-world datasets with size ranging from tens of thousands to as large as 65.6 million nodes and 3.6 billion edges. In the experiment, samples were generated into HIS, SKIS, and RIS until the total size of all the samples reaches c·n log n, where $c \in \{5, h\}$.

For a quality assessment, a relative difference parameter is defined as $$\frac{|\hat{\mathbb{I}}(S) - \mathbb{I}(S)|}{\max\{\mathbb{I}(S), \hat{\mathbb{I}}(S)\}} \cdot 100\%.$$

FIG. 20 shows a table of estimation errors measured in relative difference among HIS, SKIS, and RIS, in accordance with an illustrative embodiment. As shown, overall, HIS provides estimation with smaller errors than those compared with RIS and SKIS (0-hope). It is further shown that the errors decrease when the number of h increases to 1.

It is further observed that the time to build the HIS sketches are about the same as compared to SKIS. FIG. 21 is a table of average query time among HIS, SKIS, and RIS, in accordance with an illustrative embodiment.

Influence Maximization. FIGS. 22-25 are diagrams showing solution quality, measured as influence spread, for HIS, SKIS, and RIS, in accordance with an illustrative embodiment. When the number of samples are sufficiently large (100 k), all sketches results in similar solution quality. However, it is observed that for smaller number of samples, HIS performs better than RIS. Also, HIS with h=1 and 2 performs better than SKIS (the same with 0-hop).

Example Application of SKIS and HIS

As noted above, the exemplified systems and methods can be used to evaluate commercial campaign or political campaign. Further, the exemplified systems and methods can be used in software platforms, e.g., to monitor social media vector for deception and manipulation. In some embodiments, the exemplified systems and methods is used to enable real-time and scalable detection of cyber-threats. In some embodiments, the exemplified systems and methods is used to provide optimal and adaptive responses for damage control and public relations management.

It is noted that attack in social media space represents a significant threat. This can include attacks at the individual level, e.g., harassment and stalking, market manipulation, misinformation, and theft (e.g., theft of information or cryptocurrency). Such attack can be performed to high-profile individuals, e.g., in government, leaders of corporations, celebrities, etc. Attacks can be also be in the scale of countries, e.g., disinformation campaigns leads by the Russian against Ukraine in 2014 and against the United States in 2016.

Existing social analytic tools are not-security oriented. Most of these tools further require specialized hardware and may be address only "on surface" threats such as phishing and spam. There is a need to be able to detect targeted-attacks that are stealthy and personalized.

Figure 26:
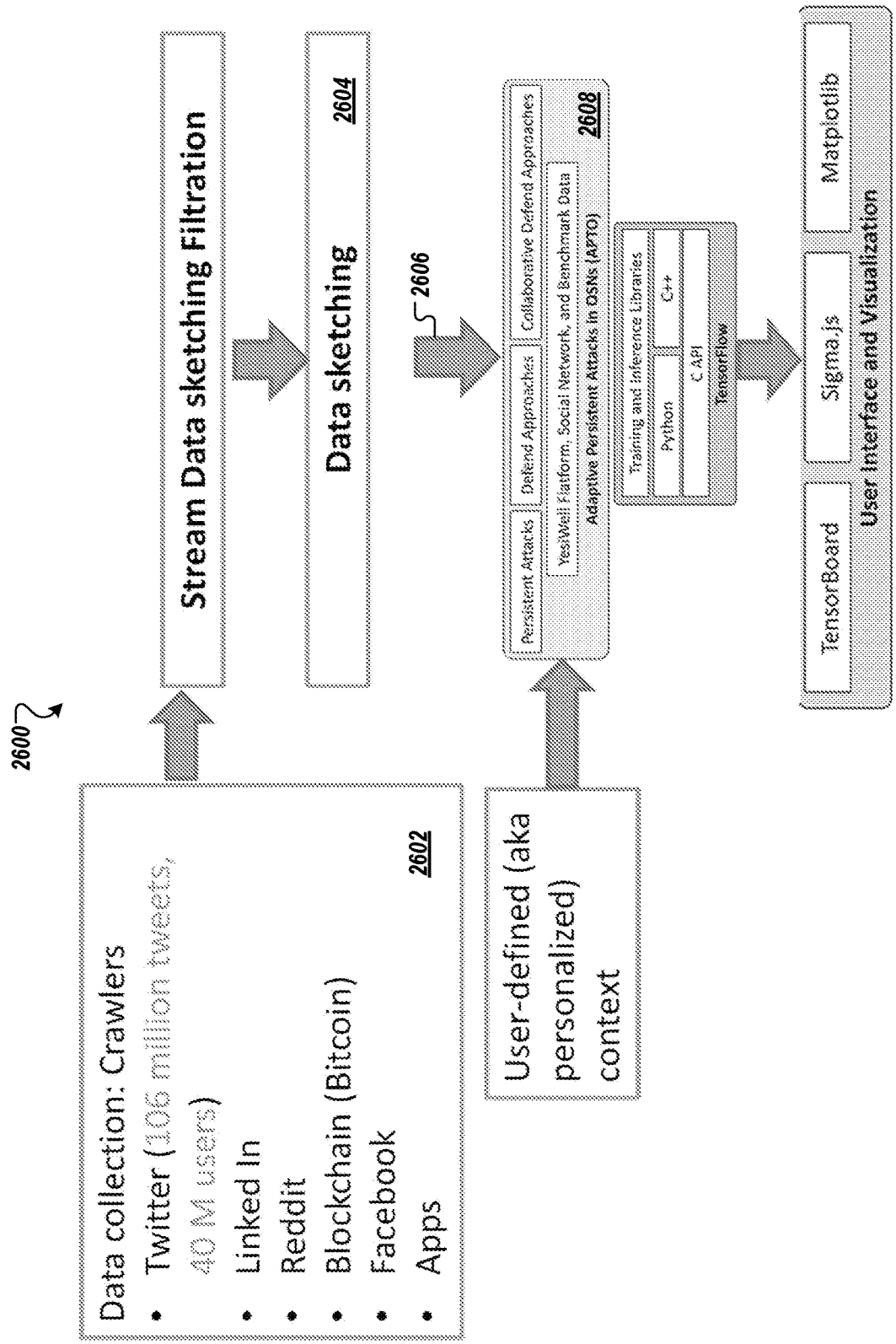
FIG. 26 is a diagram of a real-time protection system against advanced social threats, in accordance with an illustrative embodiment.

FIG. 26 is a diagram of a real-time protection system against advanced social threats, in accordance with an illustrative embodiment. The real-time protection system is configured to provide personalized and/or user-define-able analysis that are on-the-fly for massive data networks. In some embodiments, the real-time protection system is used for attack intention discovery (DIA) to expose attack trajectories using network embedding via deep learning. In other embodiments, the real-time protection system is used for coordination-attack discovery (AICD) to detect coordinated attacks and adversary campaigns using bimodal clustering techniques. In other embodiments, the real-time protection system is used to detect new attack types such as stealthy attacks, adversarial social campaigns against organizations, and coordinated market manipulation.

As shown in FIG. 26, the real-time protection system 2600 includes a crawler 2602 and a data analysis system 2604. The crawler 2602 may be configured to crawl through social networks such as Twitter, LinkedIn, Reddit, Blockchain networks, Facebook, and Apps networks. The crawled data are provided as input to the analysis system 2604 which generates sketch data set from such data.

The analysis system 2604 can use the generated sketch 2606 that are used to identify or track persistent attacks to accounts of individuals or organizations on a social network. In some embodiments, the analysis system 2608 is used to provide "defend approaches" capabilities. In some embodiments, the analysis system 2608 is used to provide "collaborative defend approaches" capabilities.

To provide for the identification of cyber-threats, the analysis system 2608 may employ the oracle as described in relation to FIG. 3. In some embodiments, the estimated influence for a set of nodes in a network may be queried. Multiple queries may then be submitted over time to assess change in estimated influence with respect to the set of nodes. Specifically, the queries may be applied to a set of targets $T \subseteq V$ that may correspond to accounts of the employees or individuals who need protection. For any suspicious user a in the network, the system can repeatedly query and monitor the influence of a towards the targets. The intuition is that the attacker(s) want to gradually approach the target, thus, will increase the influence towards the target over time.

Example System

Figure 27:
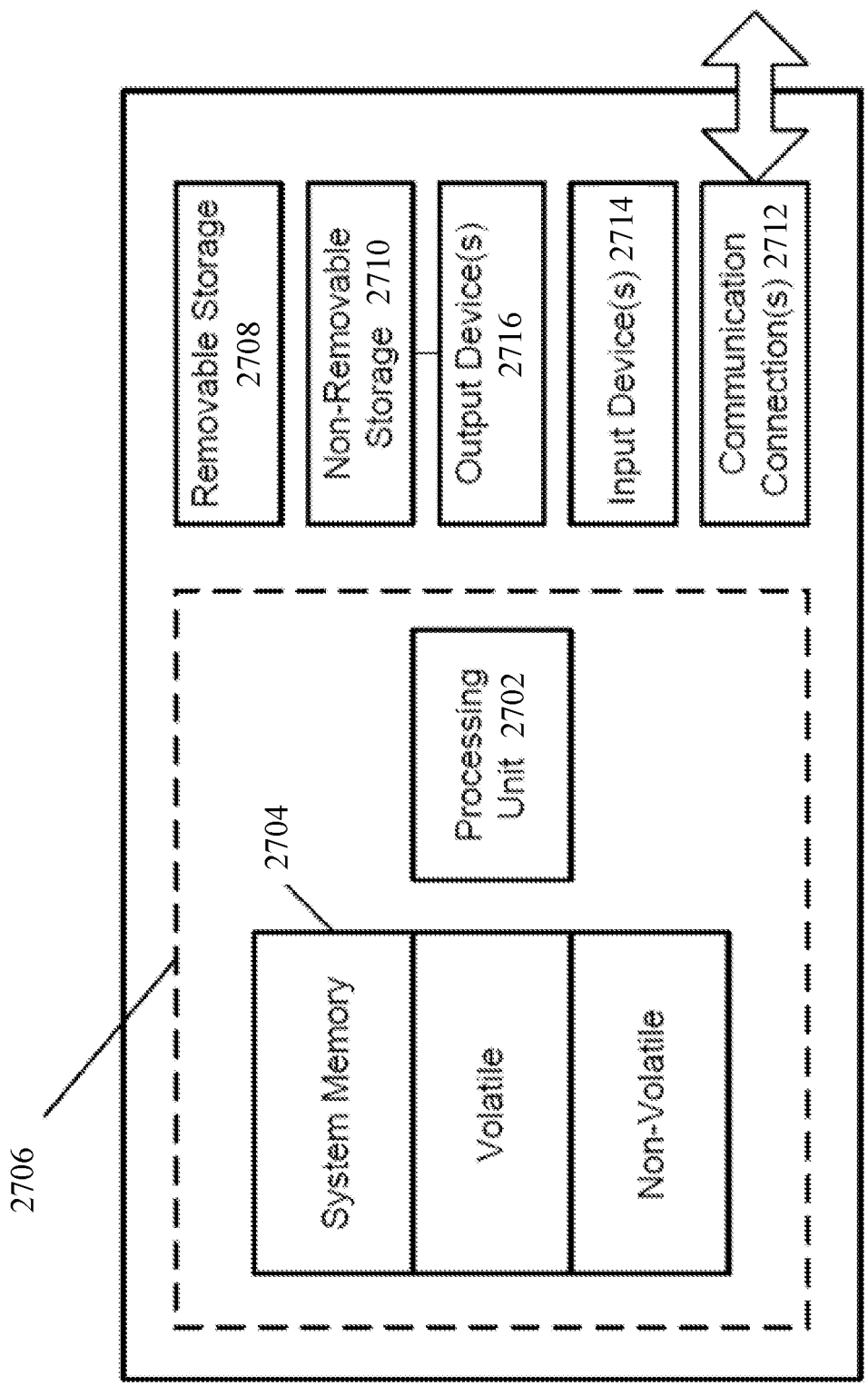
FIG. 27 is a diagram of an exemplary system for implementing aspects described herein includes a computing device.

With reference to FIG. 27, an exemplary system for implementing aspects described herein includes a computing device, such as computing device 2700. In its most basic configuration, computing device 2700 typically includes at least one processing unit 2702 and memory 2704. Depending on the exact configuration and type of computing device, memory 2704 may be volatile (such as random access memory (RAM)), non-volatile (such as read-only memory (ROM), flash memory, etc.), or some combination of the two. This most basic configuration is illustrated in FIG. 27 by dashed line 2706.

Computing device 2700 may have additional features/functionality. For example, computing device 2700 may include additional storage (removable and/or non-removable) including, but not limited to, magnetic or optical disks or tape. Such additional storage is illustrated in FIG. 27 by removable storage 2708 and non-removable storage 2710.

Computing device 900 typically includes a variety of tangible computer readable media. Computer readable media can be any available tangible media that can be accessed by device 900 and includes both volatile and non-volatile media, removable and non-removable media.

Tangible computer storage media include volatile and non-volatile, and removable and non-removable media implemented in any method or technology for storage of information such as computer readable instructions, data structures, program modules or other data. Memory 2704, removable storage 2708, and non-removable storage 2710 are all examples of computer storage media. Tangible computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 2700. Any such computer storage media may be part of computing device 2700.

Computing device 2700 may contain communications connection(s) 2712 that allow the device to communicate with other devices. Computing device 2700 may also have input device(s) 2714 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Having thus described several embodiments of the present disclosure, it will be rather apparent to those skilled in the art that the foregoing detailed disclosure is intended to be presented by way of example only, and is not limiting. Many advantages for non-invasive method and system for location of an abnormality in a heart have been discussed herein. Various alterations, improvements, and modifications will occur and are intended to those skilled in the art, though not expressly stated herein. These alterations, improvements, and modifications are intended to be suggested hereby, and are within the spirit and the scope of the present disclosure. Additionally, the recited order of the processing elements or sequences, or the use of numbers, letters, or other designations therefore, is not intended to limit the claimed processes to any order except as may be specified in the claims. Accordingly, the present disclosure is limited only by the following claims and equivalents thereto.

What is claimed is:

1. A method comprising:
   receiving, by one or more processors, a graph data set comprising a plurality of nodes for a network; and
   generating, by the one or more processors, a sketch data set by uniformly sampling at random a plurality of source nodes from the graph data set, wherein the uniform sampling at random is based on determined probabilities of each source node having a non-singular reverse cascade, wherein the non-singular reverse cascade comprises, at least, each source node and one or more neighbor nodes expected to have a quantifiable influence on the source node, and wherein a selected source node having a single reverse cascade is excluded from the sketch data set,
   wherein the sketch data set is used to detect, or evaluate impact of, stealthy cyber-attacks, adversarial social campaigns, and coordinated market manipulation.

2. The method of claim 1, wherein the received graph data set comprises a plurality of weight values each associated with a given node, wherein each weight value corresponds to a probability value of the given node being an edge node.

3. The method of claim 1, wherein the step of generating the sketch data set further comprises:
   randomly sampling, by the one or more processors, a first in-neighbor nodes to add to a queue associated with the randomly sampled source node, wherein the sampling is based on probabilities associated with weight values of the nodes being an edge node.

4. The method of claim 3, wherein the step of generating the sketch data set further comprises:
   iteratively adding, for each newly added node including the first in-neighbor node, neighbors of the newly-added node, wherein the addition of the neighbors is based on a random sampling having probabilities equal to an edge weight value associated with the newly added node.

5. The method of claim 1, further comprising:
   determining, by the one or more processor, a number of the plurality of source nodes to randomly sample to include in the sketch data set to provide a $(\epsilon, \delta)$-estimation guarantee, wherein, at least, number of the plurality of source nodes are randomly sampled to generate the sketch data set.

6. The method of claim 1, further comprising:
   determining, by the one or more processors, an optimal cover set of a pre-determined size based on the generated sketch data set, wherein the optimal cover set comprises nodes that, in their aggregate, provide a maximum estimate of expected influence within the graph data set.

7. The method of claim 3, wherein the step of generating the sketch data set is based on, or combined with, an algorithm selected from the group consisting of a RIS-based algorithm, a TIM-based algorithm, a TIM$^+$-based algorithm, an IMM-based algorithm, a BCT-based algorithm, a SSA-based algorithm, a DSSA-based algorithm, and a combination of any of the above.

8. The method of claim 2, wherein the weight values of the edges in the graph data set are determined based on a weight assignment models or based on learning from data traces.

9. The method of claim 1, wherein the step of generating the sketch data set comprises:
   uniformly sampling at random a plurality of source nodes from the graph data set, wherein the uniform sampling at random is based on determined probabilities of each source node having a non-singular reverse cascade, wherein the non-singular reverse cascade comprises, at least, each source node and one or more neighbor nodes expected to have a quantifiable influence on the source node; and for each randomly sampled source node, randomly sampling, by the one or more processors, a first in-neighbor nodes to add to a queue associated with the randomly sampled source node, wherein the sampling is based on probabilities associated with weight values of the nodes being an edge node and iteratively adding, for each newly added node including the first in-neighbor node, neighbors of the newly-added node, wherein the addition of the neighbors is based on a random sampling having probabilities equal to an edge weight value associated with the newly added node.

10. The method of claim 9, wherein influence is determined based on an independent cascade model.

11. The method of claim 9, wherein influence is determined based on at least one of a linear threshold model and a continuous-time model.

12. The method of claim 1, further comprising:
in response to receipt of an influence inquiry, wherein the influence inquiry comprises a list of one or more nodes in the network, determining, by the one or more processors, an estimated expected influence value of the one or more nodes.

13. The method of claim 12, further comprising:
generating a first sketch data set based on a first graph data set;
generating a second sketch data set based on a second graph data set; and
determining, by the one or more processors, changes between a first estimated expected influence value for a set of nodes determined from the first sketch data set and a second estimated expected influence value for the set of nodes determined from the second sketch data set.

14. The method of claim 12, further comprising:
generating the sketch data set based on the graph data set;
determining, by the one or more processors, a first estimated expected influence value for a first set of nodes determined from the sketch data set;
determining, by the one or more processors, a second estimated expected influence value for a second set of nodes determined from the sketch data set, wherein the first set of nodes is different from the second set of nodes; and
generating, by the one or more processors, a report of the first estimated expected influence value and the second estimated expected influence value.

15. The method of claim 1, wherein the network comprises a social network platform.

16. The method of claim 1, wherein the steps are performed on a cloud service platform.

17. The method of claim 9, further comprising:
determining a local influence estimator for each node, wherein the local influence estimator define a number of hops to which samples can reach a seed node.

18. A system, comprising:
a processor;
a memory having instructions stored thereon, wherein execution of the instructions by the processor, cause the processor to:
receive a graph data set comprising a plurality of nodes for a network; and
generate a sketch data set by uniformly sampling at random a plurality of source nodes from the graph data set, wherein the uniform sampling at random is based on determined probabilities of each source node having a non-singular reverse cascade, wherein the non-singular reverse cascade comprises, at least, each source node and one or more neighbor nodes expected to have a quantifiable influence on the source node, and wherein a selected source node having a single reverse cascade is excluded from the sketch data set,
wherein the sketch data set is used to detect, or evaluate impact of, stealthy cyber-attacks, adversarial social campaigns, and coordinated market manipulation.

19. A non-transitory computer readable medium having instructions stored thereon, wherein execution of the instructions by a computing device causes the computing device to:
receive a graph data set comprising a plurality of nodes for a network; and
generate a sketch data set by uniformly sampling at random a plurality of source nodes from the graph data set, wherein the uniform sampling at random is based on determined probabilities of each source node having a non-singular reverse cascade, wherein the non-singular reverse cascade comprises, at least, each source node and one or more neighbor nodes expected to have a quantifiable influence on the source node, and wherein a selected source node having a single reverse cascade is excluded from the sketch data set,
wherein the sketch data set is used to detect, or evaluate impact of, stealthy cyber-attacks, adversarial social campaigns, and coordinated market manipulation.

* * * * *